US012779257B2

(12) United States Patent
Shaver et al.

(10) Patent No.: US 12,779,257 B2
(45) Date of Patent: Nov. 3, 2026

(54) FALL ARRESTING DEVICE CONNECTOR

(71) Applicant: 3M INNOVATIVE PROPERTIES COMPANY, St. Paul, MN (US)

(72) Inventors: Stephen D. Shaver, Cottage Grove, MN (US); Judd J. Perner, East Dubuque, IL (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1620 days.

(21) Appl. No.: 16/641,351

(22) PCT Filed: Sep. 12, 2018

(86) PCT No.: PCT/IB2018/056986
§ 371 (c)(1),
(2) Date: Feb. 24, 2020

(87) PCT Pub. No.: WO2019/058220
PCT Pub. Date: Mar. 28, 2019

(65) Prior Publication Data

US 2020/0206549 A1 Jul. 2, 2020

Related U.S. Application Data

(60) Provisional application No. 62/561,855, filed on Sep. 22, 2017.

(51) Int. Cl.
*A62B 35/00* (2006.01)

(52) U.S. Cl.
CPC ...... *A62B 35/0037* (2013.01); *A62B 35/0025* (2013.01); *A62B 35/0031* (2013.01); *A62B 35/00* (2013.01)

(58) Field of Classification Search
CPC . A62B 35/0037; A62B 35/0025; A62B 35/00; A62B 35/0031

(Continued)

(56) References Cited

U.S. PATENT DOCUMENTS 2,309,751 A 2/1943 Chance
6,068,310 A * 5/2000 Fuller ....................... B66C 1/66 294/215

(Continued)

FOREIGN PATENT DOCUMENTS

CN 102974054 A 3/2013
CN 203342232 U 12/2013

(Continued)

OTHER PUBLICATIONS

International Search Report for PCT International Application No. PCT/IB2018/056986, mailed on Dec. 27, 2018, 5 pages.

(Continued)

*Primary Examiner* — Taylor Morris

(74) *Attorney, Agent, or Firm* — Johannes P. M. Kusters; Kenneth B. Wood

(57) ABSTRACT

A connector for coupling fall arresting devices to a safety harness. The connector includes a ring that encircles a space configured to receive at least one strap of the safety harness, a first connector member configured to receive a first fall arresting device, and a second connector member configured to receive a second fall arresting device. The ring includes a lateral member, a first side member coupled to a first end of the lateral member, and a second side member coupled to a second end of the lateral member that is opposite the first end. The first connector member is integrally formed with the lateral member, first side member, and second side member.

11 Claims, 10 Drawing Sheets

(58) Field of Classification Search
USPC ........................................................ 182/3
See application file for complete search history.

(56) References Cited

U.S. PATENT DOCUMENTS

| | | | | |
|---|---|---|---|---|
| 6,804,830 | B2 * | 10/2004 | Reynolds | A62B 35/0018 2/69 |
| 6,966,324 | B2 * | 11/2005 | Guido | E04H 15/64 24/265 AL |
| 7,178,632 | B2 | 2/2007 | Casebolt et al. | |
| 8,172,476 | B2 * | 5/2012 | Berney | F16G 15/08 403/164 |
| 8,375,467 | B2 * | 2/2013 | Real | A62B 35/0018 2/69 |
| 8,938,864 | B2 * | 1/2015 | Casebolt | A44B 11/04 294/82.23 |
| 9,089,723 | B2 * | 7/2015 | Bagnaro | E21B 41/0021 |
| 9,121,462 | B2 * | 9/2015 | Casebolt | A62B 35/0093 |
| 9,273,717 | B2 * | 3/2016 | Schlangen | A62B 35/0037 |
| 9,295,305 | B2 * | 3/2016 | Patel | A62B 35/0031 |
| 9,427,608 | B2 | 8/2016 | Fink et al. | |
| 9,446,295 | B2 | 9/2016 | Matte | |
| 9,861,839 | B2 | 1/2018 | Perner | |
| 10,112,064 | B2 * | 10/2018 | Bouquier | A62B 35/0025 |
| 10,343,001 | B2 * | 7/2019 | Seman | A62B 35/0075 |
| 11,369,816 | B2 * | 6/2022 | Carrasca | A62B 35/0037 |
| 11,446,526 | B2 * | 9/2022 | Guthrie | F16B 13/0891 |
| 2005/0067222 | A1 * | 3/2005 | Casebolt | A62B 35/0037 182/30 |
| 2005/0127235 | A1 * | 6/2005 | McPherson | B65H 49/22 242/129 |
| 2005/0205356 | A1 * | 9/2005 | Velasco | A62B 35/0037 182/3 |
| 2007/0163834 | A1 * | 7/2007 | Casebolt | A62B 1/04 182/3 |
| 2008/0060873 | A1 * | 3/2008 | Lang | A62B 35/0018 182/18 |
| 2009/0211849 | A1 | 8/2009 | Smith et al. | |
| 2010/0326767 | A1 * | 12/2010 | Guthrie | A62B 35/0006 182/3 |
| 2014/0060966 | A1 | 3/2014 | Patel et al. | |
| 2014/0224580 | A1 * | 8/2014 | Casebolt | F16F 7/006 188/376 |
| 2014/0331459 | A1 * | 11/2014 | Fink | A62B 35/0037 24/302 |
| 2015/0107059 | A1 | 4/2015 | Casebolt | |
| 2016/0074681 | A1 | 3/2016 | Boraas et al. | |
| 2016/0089554 | A1 | 3/2016 | Perner | |
| 2016/0361577 | A1 | 12/2016 | Perner et al. | |
| 2017/0120087 | A1 * | 5/2017 | Cowell | A62B 35/0006 |
| 2017/0216635 | A1 | 8/2017 | Stibilj | |
| 2018/0154196 | A1 * | 6/2018 | Cowell | A62B 35/0037 |
| 2018/0345053 | A1 * | 12/2018 | Bouquier | A62B 35/0025 |
| 2018/0345054 | A1 * | 12/2018 | Yang | A62B 35/0068 |
| 2019/0022436 | A1 * | 1/2019 | Emonin | A44B 11/2584 |
| 2019/0069644 | A1 * | 3/2019 | Hetrich | A62B 35/0037 |
| 2019/0105521 | A1 * | 4/2019 | Roger | A62B 35/0037 |
| 2020/0230445 | A1 * | 7/2020 | Auston | A62B 35/0031 |
| 2024/0252855 | A1 * | 8/2024 | Audelo Navarro | A62B 35/005 |

FOREIGN PATENT DOCUMENTS

| | | | | | |
|---|---|---|---|---|---|
| CN | 220404759 | U | * | 1/2024 | A62B 35/0018 |
| DE | 4214538 | A1 | * | 11/1993 | A62B 35/00 |
| EP | 1596941 | | | 8/2008 | |
| EP | 2609967 | A2 | | 7/2013 | |
| EP | 3162411 | A1 | * | 5/2017 | A62B 35/0006 |
| EP | 3228363 | A1 | * | 10/2017 | A62B 35/00 |
| FR | 3063652 | A1 | * | 9/2018 | A62B 35/0006 |
| WO | WO-0047098 | A1 | * | 8/2000 | A62B 35/0018 |
| WO | WO 2008-030552 | | | 3/2008 | |
| WO | WO-2008030552 | A2 | * | 3/2008 | A62B 35/0018 |
| WO | WO-2016200809 | A1 | * | 12/2016 | A62B 35/00 |
| WO | WO 2019-012468 | | | 1/2019 | |

OTHER PUBLICATIONS

Search Report for TW Appl. No. 107133295, mailed Sep. 23, 2021, 1 pg.

Supplementary Search Report for EP Appl. No. 18859624, mailed May 11, 2021, 2 pp.

Search Report for CN Appl. No. 201880061685.7, mailed on Oct. 10, 2020, 1 pg.

* cited by examiner

FALL ARRESTING DEVICE CONNECTOR

TECHNICAL FIELD

This disclosure relates to safety equipment and, in particular, fall protection systems and devices.

BACKGROUND

Fall protection systems and devices are important safety equipment for workers operating at potentially harmful or even deadly heights. For example, to help ensure safety in the event of a fall, workers often wear safety harnesses connected to support structures with fall protection equipment such as lanyards, energy absorbers, self-retracting lifelines (SRLs), descenders, and the like. When a worker is connected to a support structure, the worker may be referred to as being "tied off" In order to maintain a safe working condition when working at height, a worker may maintain at least one point of connection to a support structure at all times. Often a worker may use two points of connection to the support structure to provide redundant safety and ensure that at least one of the points of connection remains connected to the support structure at all times.

Fall protection systems may include a variety of components for connecting a worker to a support structure (also referred to as an anchorage). For example, snap hooks, carabiners, and quick-links may have moveable gates that allow a worker to connect the safety harness of the worker to the support structure and other fall arresting devices.

SUMMARY

In general, this disclosure describes connectors for use with fall protection systems that are designed to arrest the fall of a worker when working at dangerous heights. The connectors may be used to link one or more fall arresting devices to a safety harness being worn by or otherwise couple to a user. In contrast to some connectors that include a tubular connector that is detachable from a base that connects to the safety harness, this disclosure describes a tubular connector that includes a ring that is configured to receive one or more straps of the safety harness and a tubular connector member that is configured to receive one or more fall arresting devices. The tubular connector and ring are integrally formed as a single unit. Forming the tubular connector and ring as a single (e.g., inseparable) unit may increase the strength of the connector and reduce the risk of operator error when installing the connector to a safety harness, which may increase safety of a worker.

In one example, this disclosure describes a connector for coupling fall arresting devices to a safety harness. The connector includes a ring that encircles a space configured to receive at least one strap of the safety harness, a first connector member configured to receive a first fall arresting device, and a second connector member configured to receive a second fall arresting device. The ring includes a lateral member, a first side member coupled to a first end of the lateral member, and a second side member coupled to a second end of the lateral member that is opposite the first end. The first connector member is integrally formed with the lateral member, first side member, and second side member.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
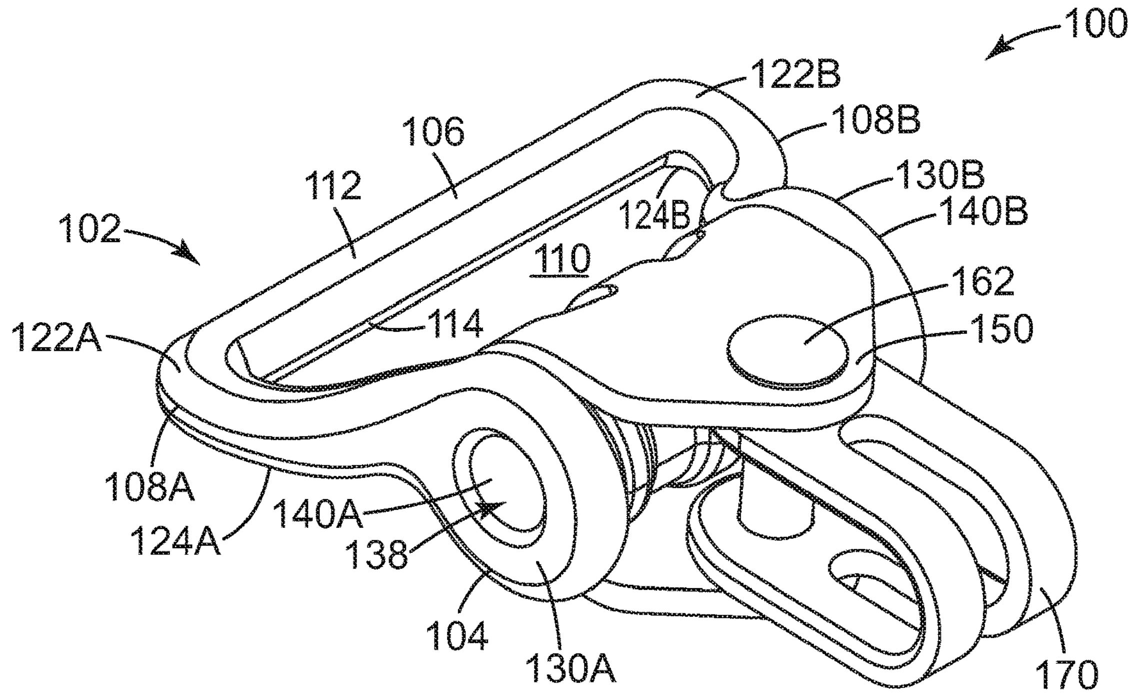
FIG. 1A is a perspective view of an example connector, in accordance with one or more aspects of the present disclosure.

This disclosure describes connectors for use with fall protection equipment and various types of fall protection systems that may be used to provide fall protection to an individual user working in at dangerous heights. Fall protection equipment may generally refer to a device used to connect a user (e.g., a worker) to a support structure for the purpose of securing the user to the support structure in the event of a fall. Examples of fall protection equipment include a variety of carabiners (also referred to as "spring hooks" or "snap hooks"), shackles, carrier sleeves, safety harnesses, fall arresting devices such as a self-retracting lifeline (SRL), or other devices that are capable of connecting a user to and disconnecting a user from the support structure. A support structure may include an anchor or another structure capable of supporting the weight of a user in the event of a fall. In some examples, the different pieces of equipment may be linked together using one or more connectors. For example, one or more fall arresting devices such as an SRL may be connected to the safety harness of a worker using a connector configured to secure the fall arresting device(s) to a strong point of the safety harness. To ensure the safety of the user, the connector must be reliable and able to withstand the forces of a fall.

Techniques of this disclosure describe example connectors that include a first connector member that is configured to receive a fall arresting device, and a ring structure that encloses a space configured to receive one or more straps of a harness. The ring and the first connector member may be integrally formed as a single (e.g., inseparable) structure. In some examples, one or more straps of the safety harness are routed through the space defined by the ring to more securely couple the connector to the safety harness. In contrast to some connectors that utilize one or more removable pieces that couple the connector to the safety harness (e.g., pins or other locking mechanisms), integrally forming the ring and the first connector member may increase the strength of the connector. In some examples, the straps of a safety harness may be woven through the connector such that the safety harness may be inseparable from the connector, which may reduce the risk of user error in attaching the safety harness to the connector, thus potentially increasing user safety.

FIGS. 1A-1F provide various views of an example connector 100 that may be used to connect a safety harness to one or more fall arresting devices such as an SRL. As illustrated, connector 100 includes a lateral member 106, first side member 108A, a second side member 108B (collectively, side members 108), and first connector member 104. First connector member 104 is configured to receive and to be physically coupled a fall arresting system (e.g., a system including a self-retracting line (SRL)) designed to arrest the fall of an operator who is strapped to and being secured to the system through connector 100. In some examples, first connector member 104 is configured to receive and be physically coupled to one or more additional connectors, such as swivel member 150 and/or second connector member 170 to allow connector 100 to be further secured to additional fall arresting devices. A space 110 defined by lateral member 106, side members 108, and first connector member 104 is configured to receive one or more straps (not shown in FIGS. 1A-1E) that are used to secure connector 100 to a safety harness worn by an operator.

Lateral member 106 may be coupled to each of side members 108A and 108B, and each of side members 108A and 108B may be coupled to connector member 104 to form a ring 102 that completely encircles and partially encloses a space 110. In other words, ring 102 may surround space 110 in 2-dimensions and partially enclose space 110 in 3-dimensions. Space 110 may include an opening through ring 102 extending from a top opening 111A through the ring 102 to a bottom opening 111B. Space 110 is configured to receive one or more straps (e.g., straps 402A, 402B shown in FIGS. 4A-4B) used to secure connector 100 to a safety harness worn by an operator (such as a human operator 410 shown in FIG. 4B).

Referring again to FIGS. 1A-1E, in some examples, lateral member 106, first side member 108A, second side member 108B, and connector member 104 are "integrally formed," wherein use of the term "integrally formed means that lateral member 106, side members 108A and 108B, and first connector member 104 may be formed as a single physical piece of material, (e.g., inseparable). Connector 100 may be cast, forged, and/or machined to integrally form lateral member 106, first side member 108A, second side member 108B, and connector member 104. In some examples, a variety of materials may be used to create connector 100. For example, connector 100 may be manufactured from a single material or a variety of materials, such as plastic (e.g., Polyvinyl chloride (PVC)), metal (e.g., aluminum), or other material.

Lateral member 106 includes a tubular shaped member extending along a longitudinal axis $AX_2$ between a first lateral member end 107A and a second lateral member end 107B. In some examples, the cross-sectional area of lateral member 106 is a particular shape, such as a circular, elliptical, square, or a rectangular shape, along the portions of lateral member 106 extending along the longitudinal axis $AX_2$ between end 107A and end 107B.

Lateral member 106 may include a top surface 112, bottom surface 114, outward facing surface 116, and inward facing surface 118 that extend along a longitudinal axis $AX_2$ of lateral member 106. In some examples, top surface 112 defines a planar surface that lies in a plane that is substantially parallel to a planar surface defined by bottom surface 114. At least a portion of outward facing surface 116 forms a first sidewall of lateral member 106 that couples top surface 112 and bottom surface 114, and at least a portion of inward facing surface 118 forms a second side wall of lateral member 106 that couples top surface 112 and bottom surface 114. In some examples, the portion of lateral member 106 forming the first side wall may form a curved surface extending from the top surface 112 to the bottom surface 114, or in other examples may form a substantially flat planar surface having at least a portion of the planar surface lying in a plane that is perpendicular to both the top surface 112 and to the bottom surface 114. In some examples, inward facing surface 118 forms a second sidewall of lateral member 106 coupling top surface 112 and bottom surface 114 which may form a curved surface or may form a substantially flat planar surface having at least a portion of the planar surface lying in a second plane that is perpendicular to both the top surface 112 and the bottom surface 114, and parallel to the plane including the outward facing surface 116.

Lateral member 106 may be defined by length dimension $L_{LM}$, width dimension $W_{LM}$, and height dimension $H_{LM}$. In some examples, the height $H_{LM}$ and width $W_{LM}$ dimensions of lateral member 106 may be uniform in cross section along the longitudinal axis $AX_2$ in the portions of lateral member 106 extending between first end 107A and second end 107B. For example, lateral member 106 may be substantially the same width along the entire length of lateral member 106 and/or substantially the same height along the entire length of lateral member 106. However, in some instances, the value of the length dimension $L_{LM}$, width dimension $W_{LM}$, and/or height dimension $H_{LM}$ of lateral member 106 may not be uniform.

Side member 108A includes a distal end $\mathbf{109}_{A1}$ coupled to first end 107A of lateral member 106, and a proximal end $\mathbf{109}_{A2}$ coupled to a first end 130A of connector member 104. Side member 108B includes a distal end $\mathbf{109}_{B1}$ coupled to second end 107B of lateral member 106, and a proximal end $\mathbf{109}_{B2}$ coupled to a second end 130B of connector member 104. The coupling formed between lateral member 106 and connector member 104 by side members 108A and 108B forms the shape of ring 102 that encircles and partially encloses the space 110 included between lateral member 106 and connector member 104.

Side member 108A may include top surface 122A, bottom surface 124A, outward facing surface 126A, and inward facing surface 128A. At least a portion of outward facing 126A forms a first sidewall of side member 108A that couples top surface 122A and bottom surface 124A, and at least a portion of inward facing surface 128A forms a second side wall of side member 108A that couples top surface 122A and bottom surface 124A. Similarly, side member 108B may include top surface 122B, bottom surface 124B, an outward facing surface 126B, and inward facing surface 128B. At least a portion of outward facing 126B forms a first sidewall of side member 108B that couples top surface 122B and bottom surface 124B, and at least a portion of inward facing surface 128B forms a second side wall of side member 108B that couples top surface 122B and bottom surface 124B.

In some examples, the junctions of lateral member 106 and each respective side member of side members 108 may form a curved surface. For example, inward facing surface 118 of lateral member and inward facing surface 128A of side member 108A may form a smooth or rounded surface. Similarly, inward facing surface 118 of lateral member and inward facing surface 128B of side member 108B may form a smooth or curved surface. The curved surfaces at the junctions of lateral member 106 and side members 108 may reduce the risk of harness straps tearing as the harness straps rub against the junction of lateral member 106 and one or more side members 108. In some examples, the junctions of outward facing surface 116 of lateral member and outward facing surfaces 126A, 126B of side member 108A, 108B may form a smooth or rounded surface.

Figure 1B:
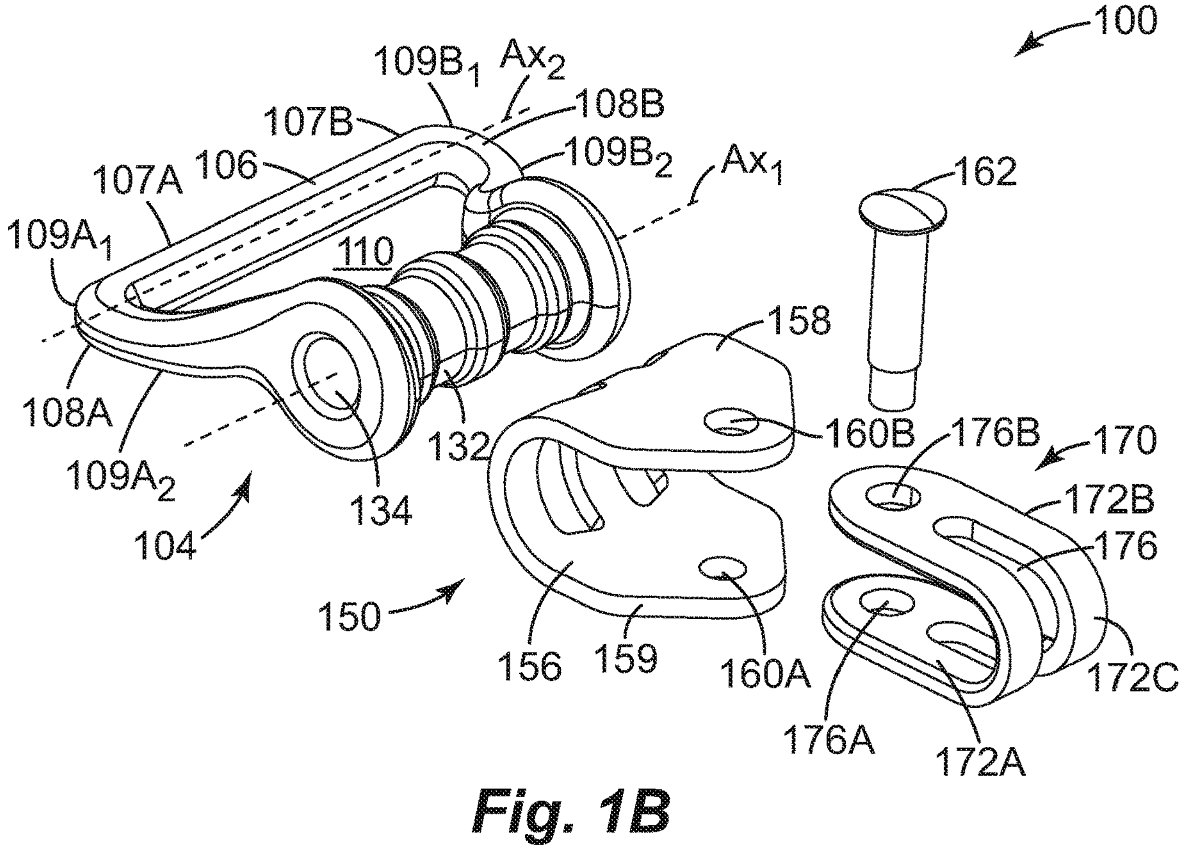
FIG. 1B is a perspective exploded view of the example connector of FIG. 1A, in accordance with one or more aspects of the present disclosure.
Figure 1C:
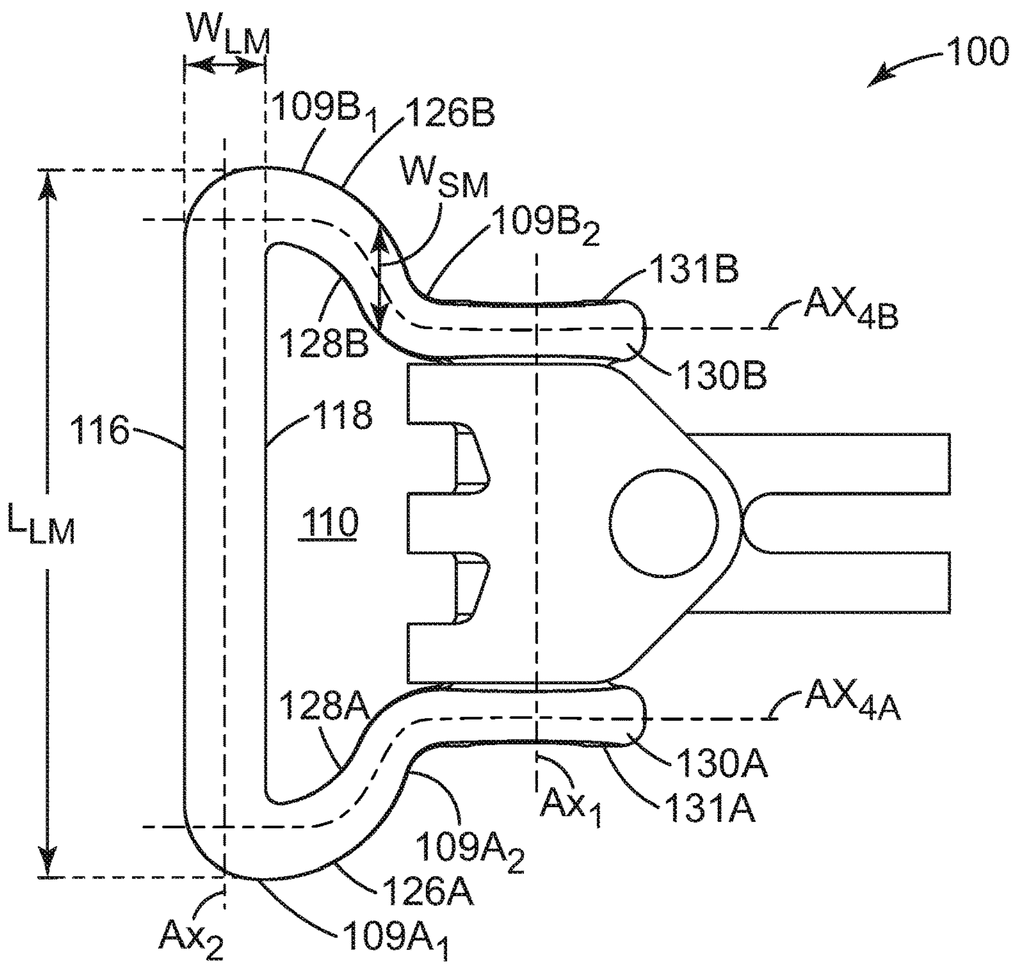
FIG. 1C is a top view of the example connector of FIG. 1A, in accordance with one or more aspects of the present disclosure.
Figure 1D:
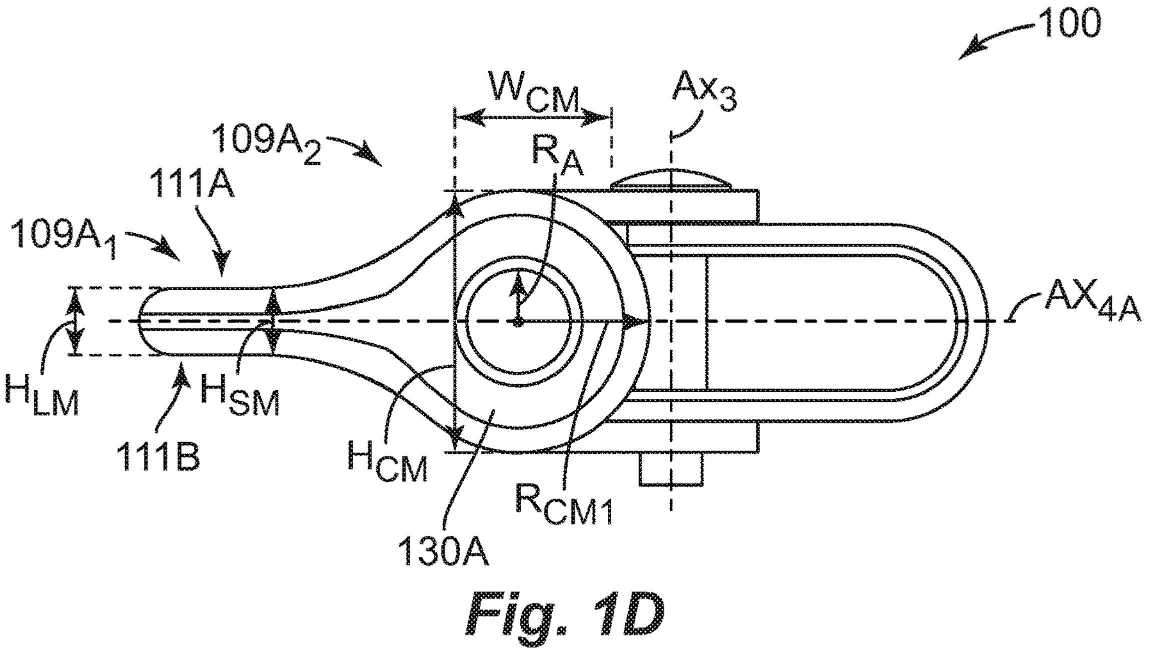
FIG. 1D is a side view of the example connector of FIG. 1A, in accordance with one or more aspects of the present disclosure.
Figure 1E:
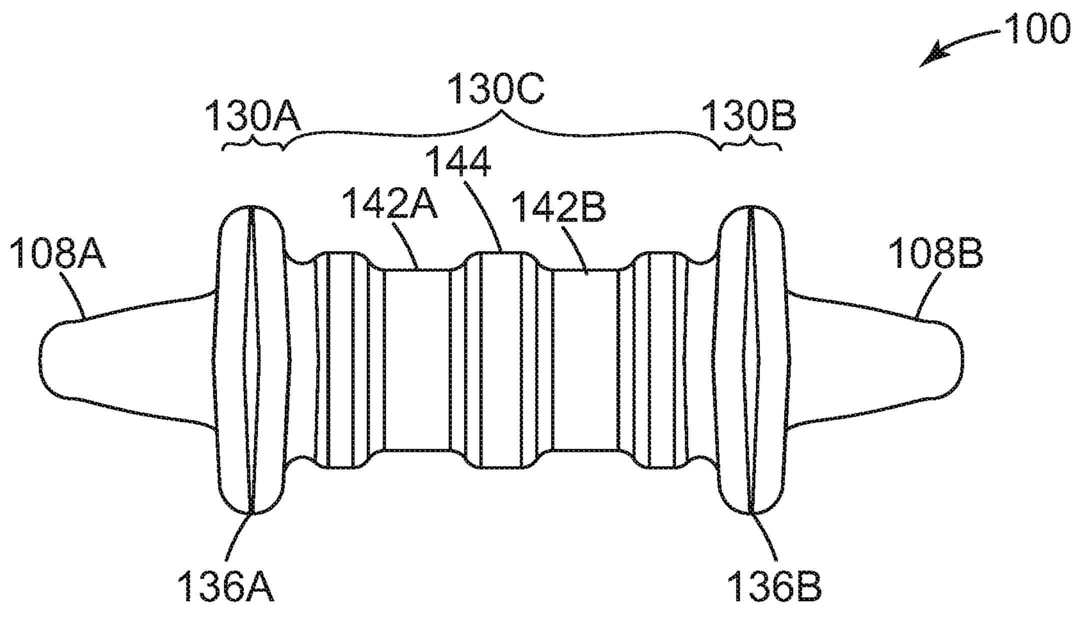
FIG. 1E is a front view of the example connector of FIG. 1A, in accordance with one or more aspects of the present disclosure.
Figure 1F:
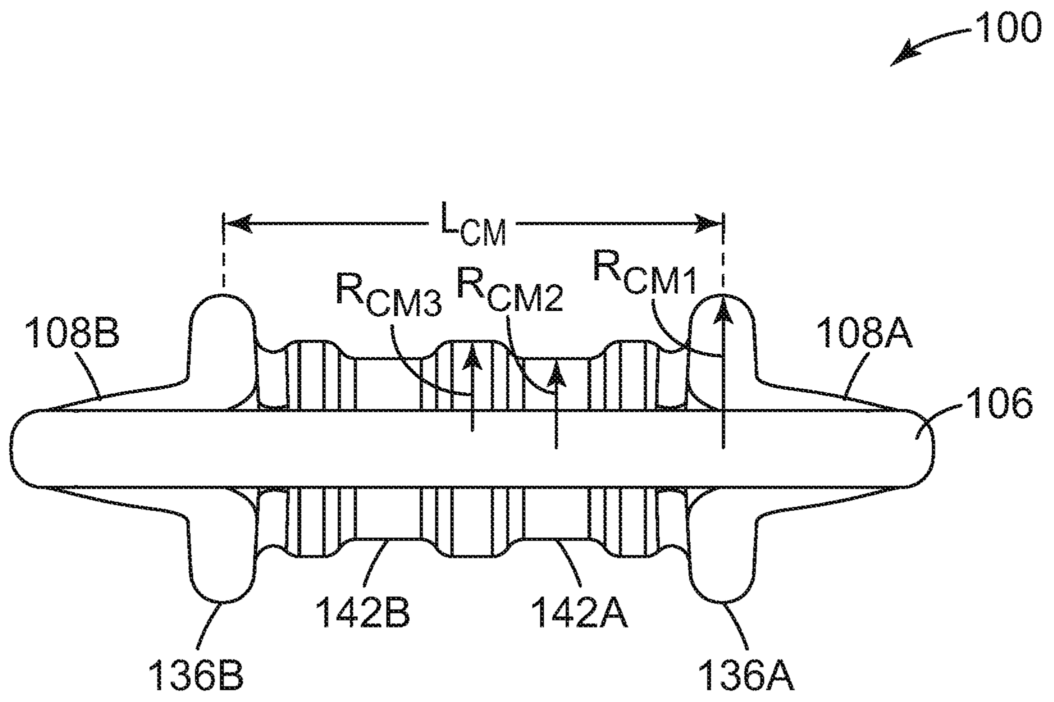
FIG. 1F is a rear view of the example connector of FIG. 1A, in accordance with one or more aspects of the present disclosure.

As illustrated in FIG. 1D, in various examples, a top surface 122A of side member 108A may form a curved surface extending away from a longitudinal axis $AX_{4A}$ of side member 108A as top surface 112A extends from the distal end $\mathbf{109}_{A1}$ to the proximal end $\mathbf{109}_{A2}$ of the side member 108A. A bottom surface 124A of side member 108A may form a curved surface extending away from a longitudinal axis $AX_{4A}$ of side member 108A as the bottom surface 124A extends away from distal end $\mathbf{109}_{A1}$ toward the proximal end $\mathbf{109}_{A2}$ of side member 108A. In some examples, the curved surfaces formed by top surface 122A and bottom surface 124A of side member 108A are mirror images of each other relative to the longitudinal axis $AX_{4A}$ and relative to the height dimension of side member 108A along longitudinal axis $AX_{4A}$. In some examples, a width dimension $W_{SM}$ of side member 108A is substantially the same thickness along the longitudinal axis $AX_{4A}$ of side member 108A as side member 108A extends between distal end $\mathbf{109}_{A1}$ and proximal end $\mathbf{109}_{A2}$. In some examples, as illustrated in FIG. 1C, when viewed from above and looking down towards the top surface 122A of side member 108A, longitudinal axis $AX_{4A}$ forms a curved line extending in a first direction away from space 110 as side member 108A approaches lateral member 106, and then extending in a direction opposite the first direction and back toward space 110 as side member 108A approaches first connector member 104.

Side member 108A and side member 108B may be mirror images of one another. For example, a top surface 122B of side member 108B may form a curved surface extending away from a longitudinal axis $AX_{4B}$ of side member 108B as top surface 112B extends from the distal end $\mathbf{109}_{B1}$ to the proximal end $\mathbf{109}_{B2}$ of the side member 108B. A bottom surface 124B of side member 108B may form a curved surface extending away from a longitudinal axis $AX_{4B}$ of side member 108B as the bottom surface 124B extends away from distal end $\mathbf{109}_{B1}$ toward the proximal end $\mathbf{109}_{B2}$ of side member 108B. In some examples, the curved surfaces formed by top surface 122B and bottom surface 124B of side member 108B are mirror images of each other relative to the longitudinal axis $AX_{4B}$ relative to the height dimension of side member 108B along longitudinal axis $AX_{4B}$. In some examples, a width dimension $W_{SM}$ of side member 108B is substantially the same thickness along the longitudinal axis $AX_{4B}$ of side member 108B as side member 108B extends between distal end $\mathbf{109}_{B1}$ and proximal end $\mathbf{109}_{B2}$. In some examples, as illustrated in FIG. 1C, when viewed from above and looking down towards the top surface 122B of side member 108B, longitudinal axis $AX_{4B}$ forms a curved line extending in a first direction away from space 110 as side member 108B approaches lateral member 106, and then extending in a direction opposite the first direction and back toward space 110 as side member 108B approaches first connector member 104.

Each side member 108 includes a length dimension $L_{SM}$, width dimension $W_{SM}$, and height dimension $H_{SM}$. The dimensions of side members 108A, 108B may or may not be uniform. As illustrated in FIG. 1C, the value of the width dimension $W_{SM}$ of side member 108A at distal end $\mathbf{109}_{A1}$ is greater than the value of the width dimension $W_{SM}$ of side member 108A at the proximal end $\mathbf{109}_{A2}$. Similarly, as illustrated in FIG. 1C, the value of the width dimension $W_{SM}$ of side member 108BA at distal end $\mathbf{109}_{B1}$ is greater than the value of the width dimension $W_{SM}$ of side member 108B at the proximal end $\mathbf{109}_{B2}$. For instance, side members 108 may be thicker towards lateral member 106 and may taper towards first connector member 104. As illustrated in the example of FIG. 1D, the value of the height dimension $H_{SM}$ of side member 108A at distal end $\mathbf{109}_{A1}$ is less than the value of the height dimension $H_{SM}$ of side member 108A at the proximal end $\mathbf{109}_{A2}$ (and similar for side member 108B). However, in some instances, the value of the width dimension $W_{SM}$ of side members 108 may be substantially the same along the entire length of side members 108A and/or the value of the height dimension $H_{SM}$ may be substantially the same along the entire length of side members 108.

First connector member 104 includes an elongated (e.g. tubular) structure extending along a longitudinal axis $AX_1$ between a first end 130A of the first connector member 104 and a second end 130B of first connector member 104. First end 130A of first connector member 104 couples to the proximal end $\mathbf{109}_{A2}$ of side member 108A and second end 130B of first connector member 104 couples to proximal end $\mathbf{109}_{B2}$ of side member 108B. First connector member 104 includes a center portion 130C that is located between first end 130A and second end 130B and that may be configured to receive and may be rotatably coupled to a swivel member 150.

First connector member 104 may include a first side surface 131A, a second side surface 131B, an outer surface 132, and an inner surface 134. At least a portion of side surface 131A may define a plane that is substantially parallel to a plane defined by at least a portion of side surface 131B. The planes defined by side surfaces 131A and 131B (collectively, side surfaces 131) may each be substantially perpendicular to the plane defined by top surface 112 of lateral member 106 and/or the plane defined by bottom surface 114 of lateral member 106.

As illustrated in FIG. 1, in some examples, first connector member 104 includes a first flange 136A and a second flange 136B (collectively, flanges 136). Flanges 136 may be configured to maintain the position of swivel member 150 within center portion 130C of first connector member 104. Flanges 136 may extend to a distance from a centerline of axis $Ax_1$ of first connector member 104 having a value defined by radius $R_{CM1}$ of first connector member 104.

In some examples, first connector member 104 may include one or more grooves, such as grooves 142A and 142B (collectively, grooves 142), that are configured to receive swivel member 150 and guide swivel member 150 as swivel member 150 rotates about axis of rotation $AX_1$. Grooves 142 may be separated by a raised portion 144, which defines radius $R_{CM3}$ of first connector member 104. In some examples, the radius $R_{CM3}$ of first connector member 104 is less than the radius $R_{CM1}$ of first connector member 104, and radius $R_{CM2}$ is less than the radius $R_{CM1}$ and $R_{CM3}$.

Figure 6:
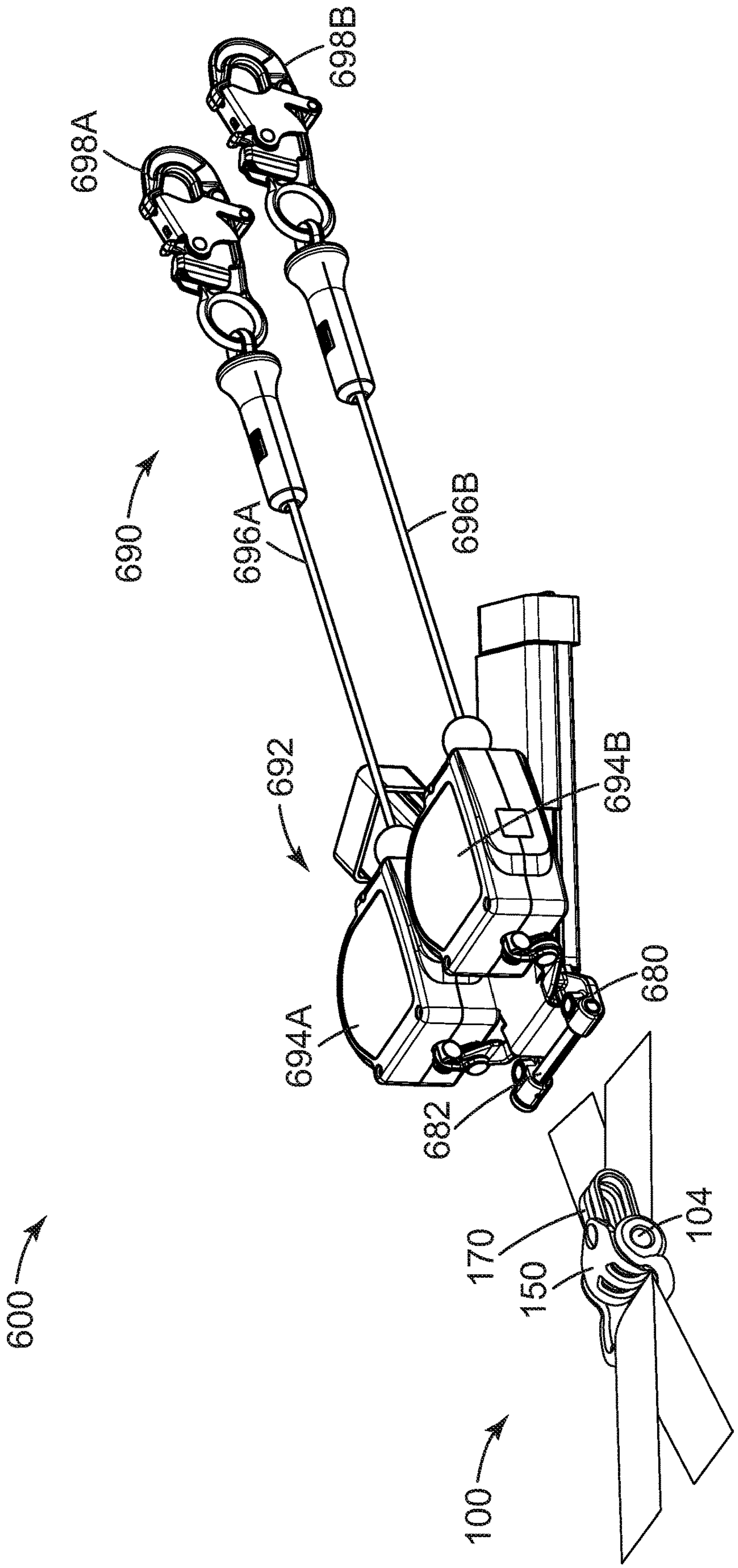
FIG. 6 is a perspective view of an example fall protection system that includes the example connector of FIGS. 1A-1E for coupling to a fall arresting device.

Side surface 131A includes an aperture 140A and side surface 131B includes aperture 140B. First connector member 104 includes a hollow region 138 defined by inner surface 134 and apertures 140A, 140B (collectively, apertures 140). Hollow region 138 may define an axis of rotation $AX_1$ that is parallel to an axis $AX_2$ defined by lateral member 106. Hollow region 138 extends from aperture 140A through first connector member 104 to aperture 140B. Hollow region 138 may be configured to receive a connector ((not shown in FIGS. 1A-1F, but e.g., an elongated connector), such as a pin, screw, or other type of connector. For example, connector 100 may be configured to receive a fall arresting device such as a self-retracting lifeline (SRL) by receiving a pin of an SRL through hollow region 138 (e.g., as illustrated in FIG. 6).

Referring again to FIGS. 1A-1F, in some examples, apertures 140 are generally circular and are defined by a radius $R_A$. In other examples, apertures 140 may be defined by other shapes, such as an oval, square, etc. and may be defined by a height dimension $H_A$ and width dimension $W_A$. In some examples, hollow region 138 is generally cylindrical. However, hollow region 138 may be any 3-dimensional shape, such as a rectangular prism.

First connector member 104 may be defined by length dimension $L_{CM}$. In some examples, as illustrated in FIG. 1A, the value of the length dimension $L_{CM}$ of first connector member 104 is less than the value of the length dimension $L_{LM}$ of lateral member 106. First connector member 104 may be defined by a height $H_{CM}$ and width $W_{CM}$. As illustrated in FIG. 1D, in some examples, the value of the height dimension $H_{CM}$ of first connector member 104 is greater than the value of the height dimension $H_{LM}$ of lateral member 106.

Swivel member 150 includes swivel arms 152A, 152B (collectively, swivel arms 152) coupled by a curved portion 154. For example, swivel member 150 may be generally C-shaped. Inner surface 156 of swivel member 150 faces (e.g., is adjacent) to outer surface 132 of first connector member 104. Outer surface 158 of swivel member 150 faces inward facing surface 118 of lateral member 106 on the opposite side of space 110. Swivel member 150 is rotatably or pivotably coupled to first connector member 104. For example, swivel member 150 may rotate or pivot around first connector member 104. Swivel member 150 and second connector member 170 are omitted from FIGS. 1E and 1F for clarity.

Swivel member 150 includes apertures 160A, 160B (collectively, apertures 160) that are substantially aligned with one another and are configured to receive a rivet 162. In some examples, apertures 160 are positioned at substantially the midpoint of the length of swivel arms 152 and proximate the side surface 159 of swivel arms 152.

In some examples, connector 100 includes a second connector member 170 configured to receive a fall arresting device. Second connector member 170 may be coupled to swivel connector member 104. Second connector member 170 may be configured to provide an additional degree of freedom for movement of a fall arresting device coupled to connector 100. For example, as illustrated in FIGS. 1A-1D, second connector member 170 may be pivotably be coupled to swivel member 150 via rivet 162. Thus, in some examples, second connector member 170 may be configured to pivot about an axis of rotation $AX_3$ that is perpendicular to the axis of rotation $AX_1$.

Second connector 170 may include a generally C-shaped structure that includes a top portion 172A, a midportion 172C, and a bottom portion 172B. As illustrated in FIG. 1B, top portion 172A is coupled to a midportion 172C, and bottom portion 172B is coupled to midportion 172C opposite top portion 172A. In some examples, top portion 172A and bottom portion 172B of second connector member 170 each includes a respective aperture 178A, 178B (collectively, apertures 178) configured to receive rivet 162. Apertures 160 of swivel member 150 and apertures 178 of second connector member 170 are aligned to receive rivet 162. In this way, second connector member 170 may pivot about axis $AX_3$ that is perpendicular to axis $AX_2$.

FIGS. 2A-2D provide various views of an example connector 200 that may be used to connect a safety harness to one or more fall arresting devices such as an SRL. As illustrated, connector 200 includes a first lateral member 206A and a second lateral member 206B (collectively, lateral members 206), a first side member 208A and a second side member 208B (collectively, side members 208), and a first connector member 204. First connector member 204 is configured to receive and to be physically coupled a fall arresting system (e.g., a system including a self-retracting line (SRL)) and may be configured to receive and be physically coupled to one or more additional connectors, such as second connector member 250 to enable connector 200 to be further secured to additional fall arresting devices. A space 210 is configured to receive one or more straps used to secure connector 200 to a safety harness worn by an operator.

Lateral members 206 may each be coupled to each of side members 208 and first connector member 204, which may form a ring 202 that completely encircles and partially encloses a space 210. In other words, ring 202 may surround space 210 in 2-dimensions and partially enclose space 210 in 3-dimensions. Space 210 may include an interior space having a shape extending to lateral members 206A and 206B and side members 208A and 208B. Space 210 may include an opening extending from a top opening 211A and through the ring 202 to a bottom opening 211B. In some examples, second lateral member 206B separates space 210 from a second, smaller space 210B defined by lateral member 206B, portions of side members 208, and first connector member 204 such that the straps received at space 210 may be separated from second connector member 250 received at second space 210B.

In some example, lateral members 206, side members 208, and first connector member 204 are integrally formed. Connector 200 may be cast, forged, and/or machined to integrally form lateral members 206, side members 208, and first connector member 204. Connectors 200 may be manufactured from a single material or a variety of materials, such as plastic (e.g., Polyvinyl chloride (PVC)), metal (e.g., aluminum), or other material.

Lateral member 206A includes a tubular shaped member extending along a longitudinal axis $AX_{2A}$ between lateral member end $\mathbf{207}_{A1}$ and lateral member end $\mathbf{207}_{B1}$, while lateral member 206B includes a tubular shaped member extending along longitudinal axis $AX_{2B}$ between lateral member end $\mathbf{207}_{A2}$ and lateral member end $\mathbf{207}_{B2}$. In some examples, axis $AX_{2A}$ is parallel to axis $AX_{2B}$. In some examples, the cross-sectional area of lateral members 206 are a particular shape, such as a circular, elliptical, square, or a rectangular shape.

Lateral members 206A, 206B may each include a respective top surface 212A, 212B (collectively, top surfaces 212), a respective bottom surface 214A, 214B (collectively, bottom surfaces 214), a respective outward facing surface 216A, 216B (collectively, outward facing surfaces 216), and a respective inward facing surface 218A, 218B (collectively, inward facing surfaces 218). Inward facing surfaces 218 face towards space 210 and outward facing surfaces 216 face away from space 210. Surfaces 212A, 214A, 216A, and 218A of lateral member 206A extend along longitudinal axis $AX_{2A}$ and surfaces 212B, 214B, 216B, and 218B of lateral member 206B extend along longitudinal axis $AX_{2B}$. In some examples, top surfaces 212 defines a planar surface that lies in a plane that is substantially parallel to a planar surface defined by bottom surfaces 214.

At least a portion of outward facing surface 216A forms a first sidewall of lateral member 206A that couples top surface 212A and bottom surface 214A, and at least a portion of inward facing surface 218A forms a second side wall of lateral member 206A that couples top surface 212A and bottom surface 214A. Likewise, at least a portion of outward facing surface 216B forms a first sidewall of lateral member 206B that couples top surface 212B and bottom surface 214B, and at least a portion of inward facing surface 218B forms a second side wall of lateral member 206B that couples top surface 212B and bottom surface 214B. In some examples, the portion of lateral members 206A and 206B forming the respective first side walls may form a curved surface extending from the top surfaces 212A, 212B respectively, to the bottom surfaces 214A, 214B respectively. In some examples, the portion of lateral members 206A and 206B forming the respective first side walls may form a substantially flat planar surface having at least a portion of the planar surface lying in a plane that is perpendicular to the top surfaces 212 and to the bottoms surfaces 214.

In some examples, inward facing surface 218A form a second sidewall of lateral member 206A coupling top surface 212A and bottom surface 214A. The second sidewall of lateral member 206A may form a curved surface or may form a substantially flat planar surface having at least a portion of the planar surface lying in a second plane that is perpendicular to both the top surface 212A and the bottom surface 214A. Similarly, inward facing surface 218B form a second sidewall of lateral member 206B coupling top surface 212B and bottom surface 214B. The second sidewall of lateral member 206B may form a curved surface or may form a substantially flat planar surface having at least a portion of the planar surface lying in a second plane that is perpendicular to both the top surface 212B and the bottom surface 214B.

In some examples, each of lateral members 206 are defined by length dimension $L_{LM}$, width dimension $W_{LM}$, and height dimension $H_{LM}$. In some examples, the height dimension $H_{LM}$ and width dimension $W_{LM}$ of lateral members 206 may be uniform in cross section along the respective longitudinal axis $AX_{2A}$ and $AX_{2B}$. For example, the value of the width dimension $W_{LM}$ of lateral members 206 may be substantially uniform along the entire length of lateral member 206 and/or the value of the height dimension $H_{LM}$ may be substantially along the entire lengths of lateral members 206. However, in some instances, the value of the length dimension $L_{LM}$, width dimension $W_{LM}$, and/or height dimension $H_{LM}$ of lateral members 206 may not be uniform.

Side member 208A includes a distal end $\mathbf{209}_{A1}$ coupled to first end 207A of lateral member 206A, and a proximal end $\mathbf{209}_{A2}$ coupled to a first end 230A of first connector member 204. In some examples, proximal end $\mathbf{209}_{A2}$ of side member 208A is coupled to a first end of lateral member 206B. Side member 208B includes a distal end $\mathbf{209}_{B1}$ coupled to second end 207B of lateral member 206, and a proximal end $\mathbf{209}_{B2}$ coupled to a second end 230B of first connector member 204. In some examples, proximal end $\mathbf{209}_{B2}$ of side member 208B is coupled to a second end of lateral member 206B. The coupling formed between lateral member 206A, side members 208A, 208B, and first connector member 204 or lateral member 206B may form the shape of ring 202 that encircles and partially encloses the space 110.

Side member 208A may include top surface 222A, bottom surface 224A, outward facing surface 226A, and inward facing surface 228A. At least a portion of outward facing 226A forms a first sidewall of side member 208A that couples top surface 222A and bottom surface 224A, and at least a portion of inward facing surface 228A forms a second side wall of side member 208A that couples top surface 222A and bottom surface 224A. Similarly, side member 208B may include top surface 222B, bottom surface 224B, and outward facing surface 226B, and inward facing surface 228B. At least a portion of outward facing 226B forms a first sidewall of side member 208B that couples top surface 222B and bottom surface 224B, and at least a portion of inward facing surface 228B forms a second side wall of side member 208B that couples top surface 222B and bottom surface 224B.

In some examples, the junction of a particular lateral member of lateral members 206 and a particular side member of side members 208 may form a curved surface. For example, inward facing surface 218A of lateral member 206A and inward facing surface 228A of side member 208A may form a smooth or rounded surface. Similarly, inward facing surface 218A of lateral member 206A and inward facing surface 228B of side member 208B may form a smooth or curved surface. The curved surfaces at the junctions of lateral members 206 and side members 208 may reduce the risk of harness straps tearing as the harness straps rub against the junction of a particular lateral member 206 and a particular side member 208. In some examples, the junctions of outward facing surfaces 216 of lateral members 206 and outward facing surfaces 226 of side member 208 may form a smooth or rounded surface.

Figure 2A:
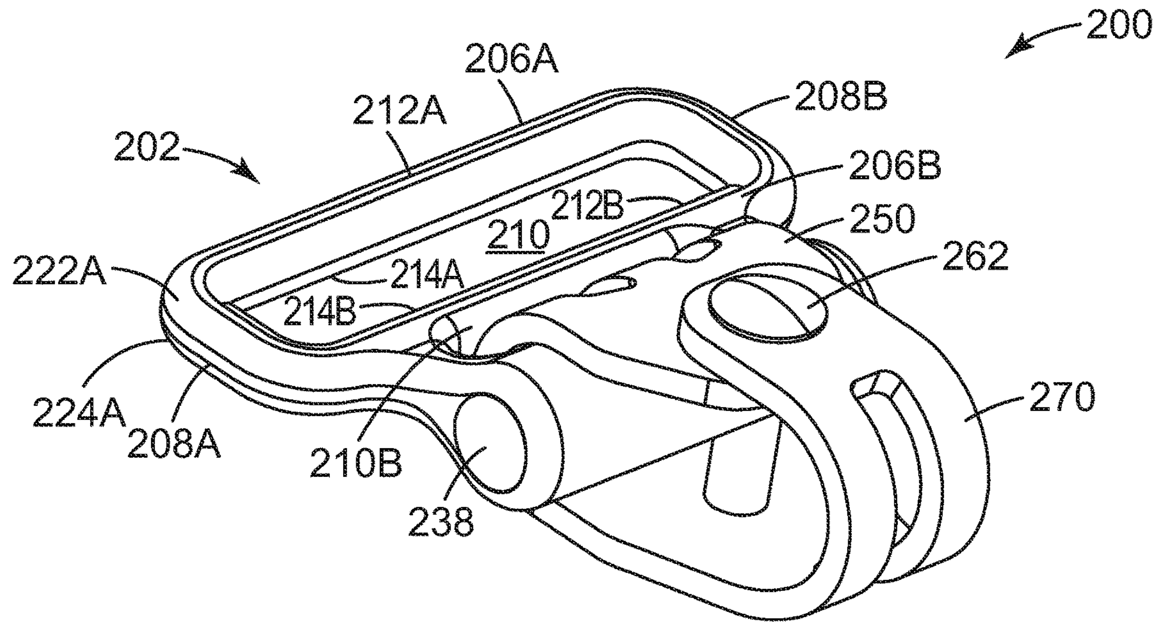
FIG. 2A is a perspective view of another example connector, in accordance with one or more aspects of the present disclosure.
Figure 2B:
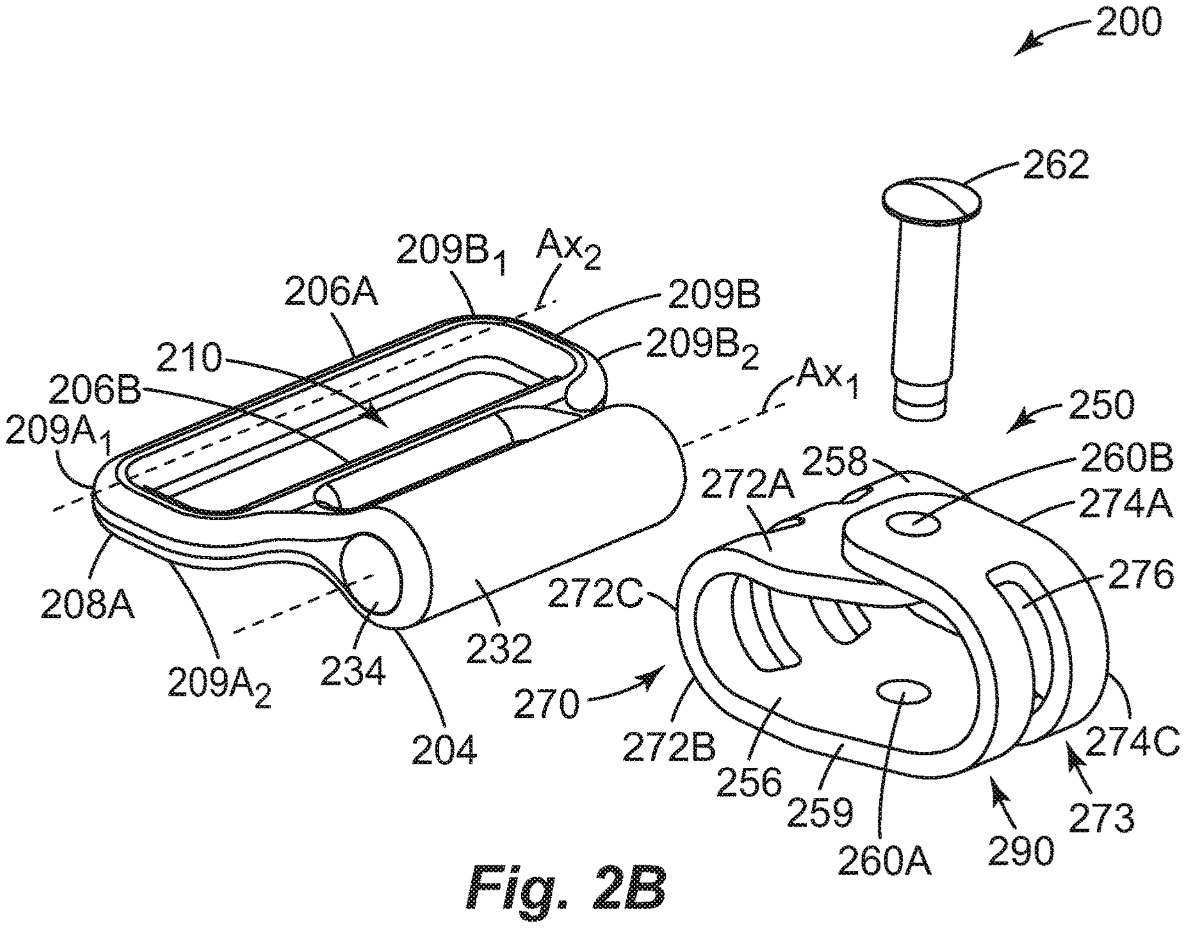
FIG. 2B is a perspective exploded view of the example connector of FIG. 2A, in accordance with one or more aspects of the present disclosure.
Figure 2C:
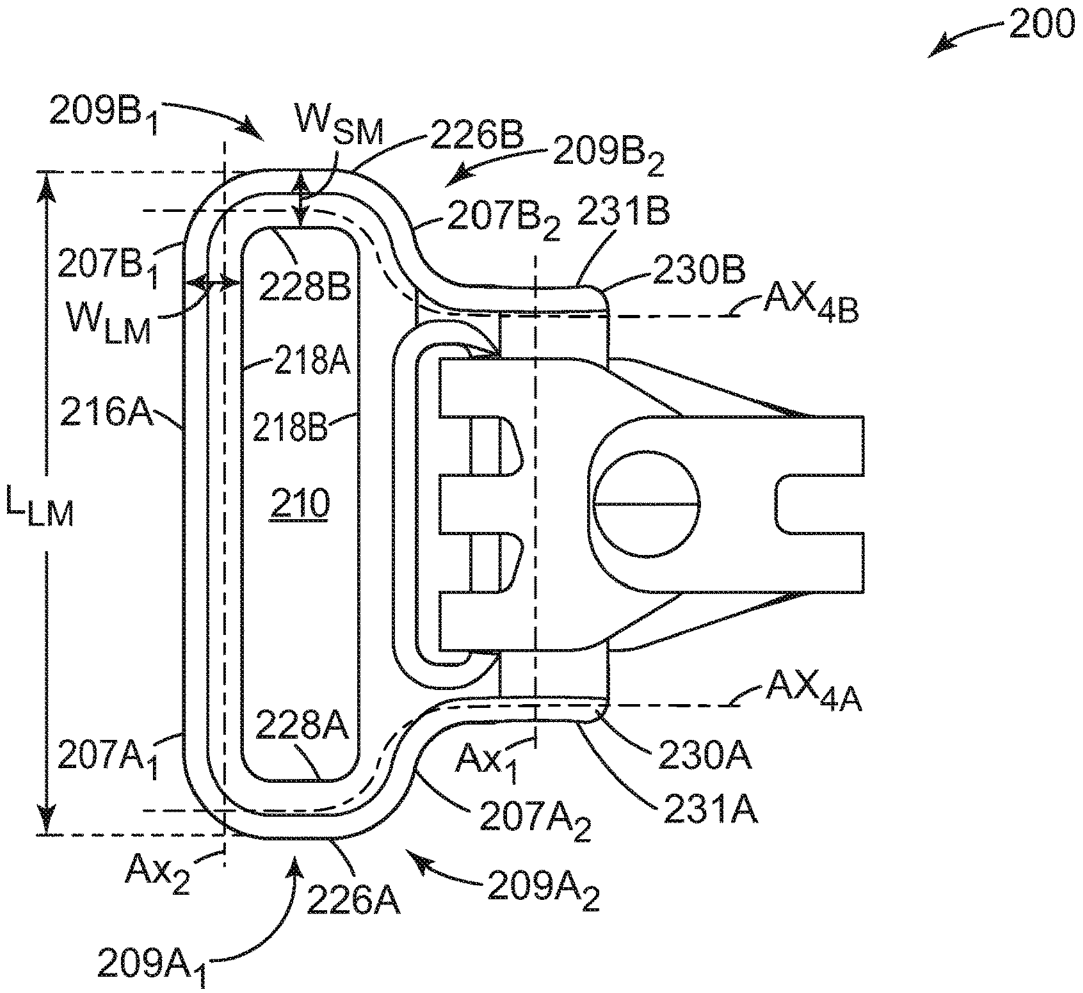
FIG. 2C is a top view of the example connector of FIG. 2A, in accordance with one or more aspects of the present disclosure.
Figure 2D:
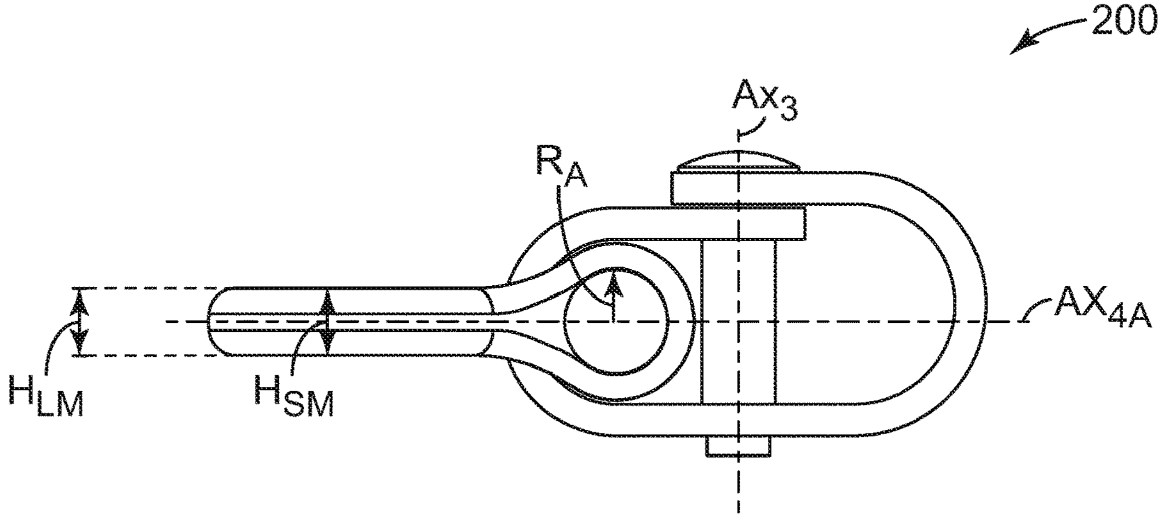
FIG. 2D is a side view of the example connector of FIG. 2A, in accordance with one or more aspects of the present disclosure.

Each side member 208 includes a length dimension $L_{SM}$, width dimension $W_{SM}$, and height dimension $H_{SM}$. The dimensions of side members 208A, 208B may or may not be uniform. As illustrated in FIG. 2C, the value of the width dimension $W_{SM}$ of side member 208A at distal end $\mathbf{209}_{A1}$ is greater than the value of the width dimension $W_{SM}$ of side member 208A at the proximal end $\mathbf{209}_{A2}$. Similarly, as illustrated in FIG. 2C, the value of the width dimension $W_{SM}$ of side member 208BA at distal end $\mathbf{209}_{B1}$ is greater than the value of the width dimension $W_{SM}$ of side member 208B at the proximal end $\mathbf{209}_{B2}$. For instance, side members 208 may be thicker towards lateral member 206 and may taper towards first connector member 204. In the example of FIG.

2D, the value of the height dimension $H_{SM}$ of side member 208A at distal end $\mathbf{209}_{A1}$ is less than the value of the height dimension $H_{SM}$ of side member 208A at the proximal end $\mathbf{209}_{A2}$ (and similar for side member 208B). However, in some instances, the value of the width dimension $W_{SM}$ of side members 208 may be substantially the same along the entire length of side members 208A and/or the value of the height dimension $H_{SM}$ may be substantially the same along the entire length of side members 208.

In various examples, a top surface 222A of side member 208A may form a curved surface extending away from a longitudinal axis $AX_{4A}$ of side member 208A as top surface 222A extends from the distal end $\mathbf{209}_{A1}$ to the proximal end $\mathbf{209}_{A2}$ of the side member 208A. For example, top surface 222A may be substantially straight between lateral member 206A and lateral member 206B, and may extend away from longitudinal axis $AX_{4A}$ between lateral member 206B and first connector member 204. A bottom surface 224A of side member 208A may form a curved surface extending away from a longitudinal axis $AX_{4A}$ of side member 208A as the bottom surface 224B extends away from distal end $\mathbf{209}_{A1}$ toward the proximal end $\mathbf{209}_{A2}$ of side member 208A. For example, bottom surface 224A may be substantially straight between lateral member 206A and lateral member 206B, and may extend away from longitudinal axis $AX_{4A}$ between lateral member 206B and first connector member 204.

Top surface 222B and bottom surface 224B of side member 208B may mirror the respective top and bottom surfaces of side member 208A. For example, top surface 222B may be substantially straight between lateral member 206A and lateral member 206B, and may extend away from longitudinal axis $AX_{4B}$ between lateral member 206B and first connector member 204. Likewise, bottom surface 224B may be substantially straight between lateral member 206A and lateral member 206B, and may extend away from longitudinal axis $AX_{4B}$ between lateral member 206B and first connector member 204.

In some examples, the value of the height dimension $H_{SM}$ of side members 208 is substantially the same between lateral members 206A and 206B and increases along the respective longitudinal axis $AX_{4A}$, $AX_{4B}$ between lateral member 206B and first connector 204. In some examples, the value of the width dimension $W_{SM}$ of side members 208 is substantially the same thickness along the respective longitudinal axis $AX_{4A}$, $AX_{4B}$ of side members 208 as side members 208 extends between lateral member 206A and lateral member 206B. In some examples, as illustrated in FIG. 2C, when viewed from above and looking down towards the top surfaces 222 of side members 208, longitudinal axes $AX_{4A}$, $AX_{4B}$ form straight lines between lateral members 206A and 206B and curved lines extending towards connector member 204 as side members 208 approach first connector member 204.

First connector member 204 includes an elongated (e.g. tubular) structure extending along a longitudinal axis $AX_1$ between a first end 230A of the first connector member 204 and a second end 203B of first connector member 204. First end 230A of first connector 204 couples to the proximal end $\mathbf{209}_{A2}$ of side member 208A and second end 230B of first connector 204 couples to proximal end $\mathbf{209}_{B2}$ of side member 208B. First connector 204 includes a center portion 230C that is located between first end 230A and second end 230B and that is configured to receive second connector member 250.

First connector member 204 may include a first side surface 231A, a second side surface 231B, an outer surface 232, and an inner surface 234. At least a portion of side surface 231A may define a plane that is substantially parallel to a plane defined by at least a portion of side surface 231B. The planes defined by side surfaces 231A and 231B (collectively, side surfaces 231) may each be substantially perpendicular to a plane defined by either (or both) of top surfaces 212 of lateral members 206 and/or a plane defined by either (or both) of bottom surfaces 214 of lateral members 206.

Side surface 231A includes an aperture 240A and side surface 231B includes aperture 240B. First connector member 104 includes a hollow region 238 defined by inner surface 236 and apertures 240A, 240B (collectively, apertures 240). Hollow region 238 may define an axis of rotation $AX_1$ that is parallel to an axis $AX_{2A}$ defined by lateral member 206A or to axis $AX_{2B}$ defined by lateral member 206B. Hollow region 238 extends from aperture 240A through first connector member 204 to aperture 240B. Hollow region 238 may be configured to receive a connector (e.g., an elongated connector), such as a pin, screw, or other type of connector. For example, connector 200 may be configured to receive a fall arresting device such as a self-retracting lifeline (SRL) by receiving a pin of an SRL through hollow region 238 (e.g., as illustrated in FIG. 6).

In some examples, apertures 240 are generally circular and are defined by a radius $R_A$. In other examples, apertures 240 may be defined by other shapes, such as an oval, square, etc. and may be defined by a height dimension $H_A$ and width dimension $W_A$. In some examples, hollow region 238 is generally cylindrical. However, hollow region 238 may be any 3-dimensional shape, such as a rectangular prism.

First connector member 204 may be defined by length dimension $L_{CM}$. In some examples, as illustrated in FIG. 2A, the value of the length dimension $L_{CM}$ of first connector member 204 is less than the value of the length dimension $L_{LM}$ of lateral members 206. First connector member 204 may be defined by a height $H_{CM}$ and width $W_{CM}$. As illustrated in FIG. 2, in some examples, the height $H_{CM}$ of first connector member 204 is that is taller than the height $H_{LM}$ of lateral member 206. First connector member 204 may be defined by a radius $R_{CM1}$.

In some examples, connector 200 includes a swivel member and a separate second connector member (e.g., swivel member 150 and second connector member 170 as shown in FIGS. 1A-1F). In some examples, connector 200 as illustrated in FIGS. 2A-2D includes a single member such as second connector member 250 that is rotatably or pivotably coupled to first connector member 204 and is configured to couple connector 200 to a fall arresting device. A first end 270 of second connector member 250 may include a top (e.g., generally flat) portion 272A coupled to a curved midportion 272C, and a bottom (e.g., generally flat) portion 272B coupled to the curved midportion. For example, the first end 270 of second connector member 250 may be generally C-shaped. The first end 270 may be positioned within space 210, or within subspace 210B, such that second connector member 250 may pivot around first connector member 204.

A second end 273 of second connector member 250 may include a top (e.g., generally flat) portion 274A coupled to a curved midportion 274C. Curved midportion 274C may couple to bottom portion 272B of first end 270. Top portion 274A, top portion 272A and bottom portion 272B may each include apertures configured to receive a rivet 262. For example, rivet 262 may be inserted into aperture 260A of top portion 274A, through an aperture (hidden) of top portion 272A and aperture 260A of bottom portion 272B.

Second connector member 250 includes an inner surface 256, outer surface 258, and side surface 259.

Second connector member 250 is configured to receive and be physically coupled to a fall arresting device. For example, second connector member 250 may be configured to receive a fastener (e.g., a carabiner) in a space 290 enclosed by first end 270 and second end 273. For instance, a fastener may travel through space 290 proximate inner surface 256 of second connector member 250. In this way, connector 200 may receive and by physically coupled to a fall arresting device via first connector member 204 and/or second connector member 250.

Figure 3A:
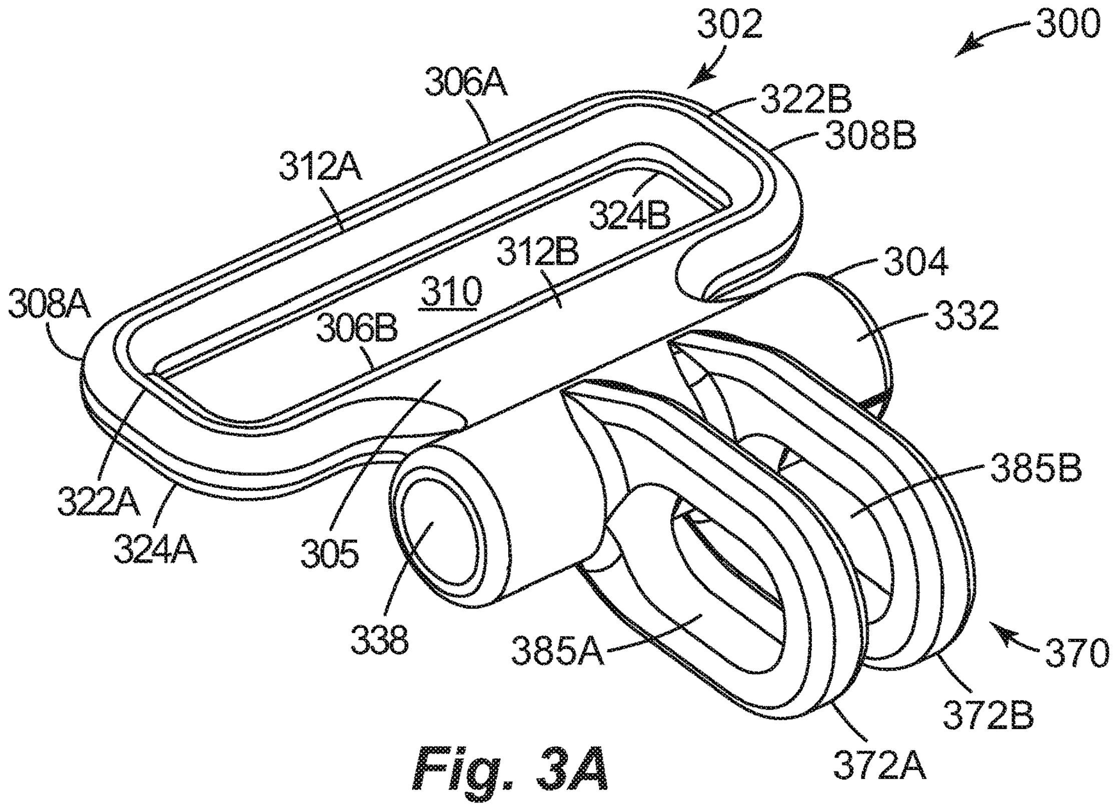
FIG. 3A is a perspective view of another example connector, in accordance with one or more aspects of the present disclosure.
Figure 3B:
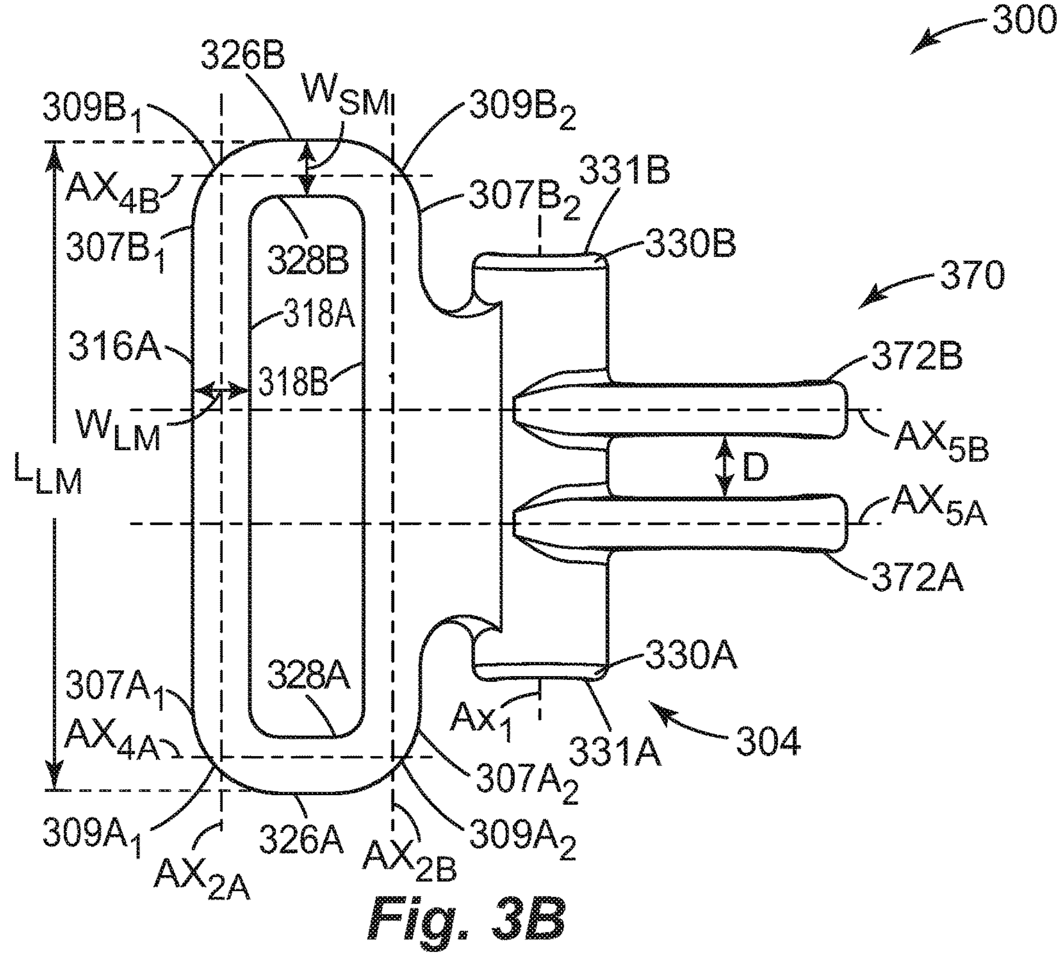
FIG. 3B is a top view of the example connector of FIG. 3A, in accordance with one or more aspects of the present disclosure.
Figure 3C:
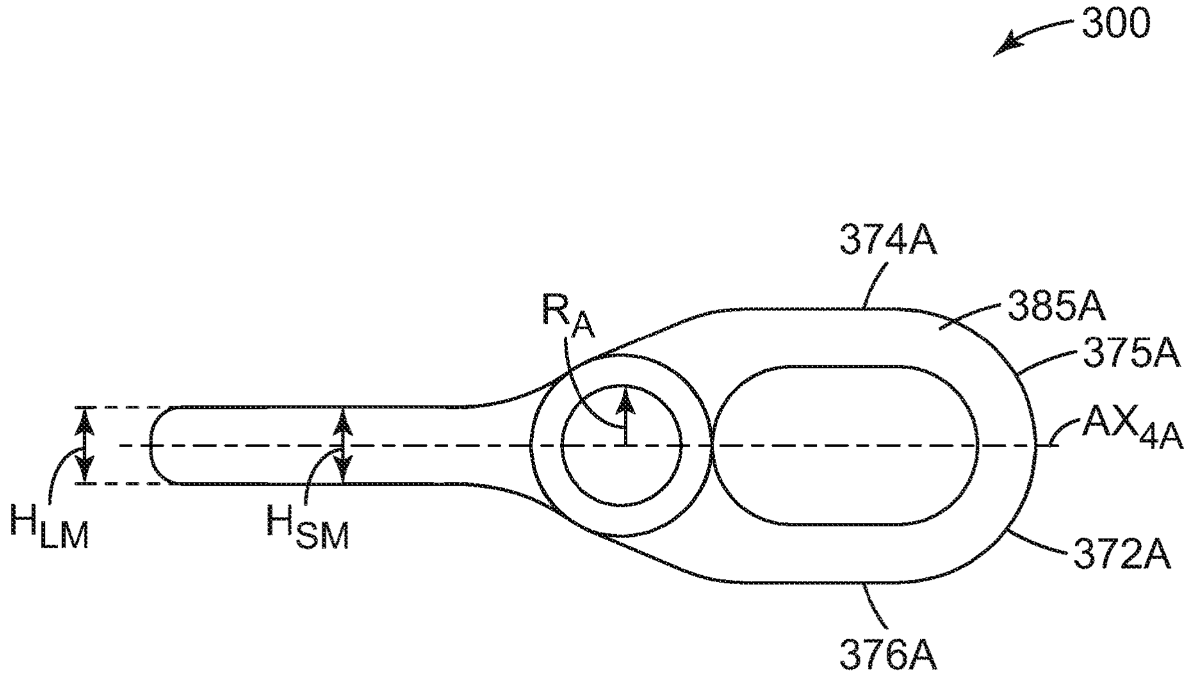
FIG. 3C is a side view of the example connector of FIG. 3A, in accordance with one or more aspects of the present disclosure.

FIGS. 3A-3C provide various views of an example connector 300 that may be used to connect a safety harness to one or more fall arresting devices such as an SRL. As illustrated, connector 300 includes a first lateral member 306A and a second lateral member 306B (collectively, lateral members 306), a first side member 308A and a second side member 308B (collectively, side members 308), and a first connector member 304. First connector member 304 is configured to receive and to be physically coupled a fall arresting system (e.g., a system including a self-retracting line (SRL)) designed to arrest the fall of an operator who is strapped to and being secured to the system through connector 300. A space 310 is configured to receive one or more straps used to secure connector 300 to a safety harness worn by an operator.

Lateral members 306 may each be coupled to each of side members 308 to form a ring 302 that completely encircles and partially encloses a space 310. In other words, ring 302 may surround space 310 in 2-dimensions and partially enclose space 310 in 3-dimensions. Space 310 may include an interior space having a shape extending to lateral members 306A and 306B and side members 308A and 308B. Space 310 may include an opening extending from a top opening 311A and through the ring 302 to a bottom opening 311B.

In some examples, lateral members 306, side members 308, and first connector member 304 are integrally formed. Connector 300 may be cast, forged, and/or machined to integrally form lateral members 306, side members 308, and first connector member 304. Connectors 300 may be manufactured from a single material or a variety of materials, such as plastic (e.g., Polyvinyl chloride (PVC)), metal (e.g., aluminum), or other material.

Lateral member 306A includes a tubular shaped member extending along a longitudinal axis $AX_{3A}$ between lateral member end $\mathbf{307}_{A1}$ and lateral member end $\mathbf{307}_{B1}$. Lateral member 306B may include a tubular shaped member extending along longitudinal axis $AX_{3B}$ between lateral member end $\mathbf{307}_{A2}$ and lateral member end $\mathbf{307}_{B2}$. In some examples, lateral member 306B may include a protrusion 305 extending away from space 310, towards first connector member 304, and coupling lateral member 306B to first connector 304. In some scenarios, protrusion 305 may be coupled to side member 308A and 308B such that there is not an opening between lateral member 306B, side members 308, and first connector member 304.

In some examples, the cross-sectional area of lateral members 306 are a particular shape, such as a circular, elliptical, square, or a rectangular shape. Lateral members 306A, 306B may each include a respective top surface 312A, 312B (collectively, top surfaces 312), a respective bottom surface 314A, 314B (collectively, bottom surfaces 314), and a respective inward facing surface 318A, 318B (collectively, inward facing surfaces 318). In some examples, lateral member 306A includes outward facing surface 316A. Inward facing surfaces 318 face towards space 310 and outward facing surfaces 316 face away from space 310. Surfaces 312A, 314A, 316A, and 318A of lateral member 306A extend along longitudinal axis $AX_{3A}$ and surfaces 312B, 314B, and 318B of lateral member 306B extend along longitudinal axis $AX_{3B}$. In some examples, top surfaces 312 define a planar surface that lies in a plane that is substantially parallel to a planar surface defined by bottom surfaces 314.

At least a portion of outward facing surface 316A forms a first sidewall of lateral member 306A that couples top surface 312A and bottom surface 314A, and at least a portion of inward facing surface 318A forms a second side wall of lateral member 306A that couples top surface 312A and bottom surface 314A. Likewise, at least a portion of inward facing surface 318B forms a side wall of lateral member 306B that couples top surface 312B and bottom surface 314B. In some examples, the portion of lateral members 306A and 306B forming the respective first side walls may form a curved surface extending from the top surfaces 312A, 312B respectively, to the bottom surfaces 314A, 314B respectively. In some examples, the portion of lateral members 306A and 306B forming the respective first side walls may form a substantially flat planar surface having at least a portion of the planar surface lying in a plane that is perpendicular to the top surfaces 312 and to the bottoms surfaces 314.

In some examples, inward facing surface 318A forms a second sidewall of lateral member 306A coupling top surface 312A and bottom surface 314A. The second sidewall of lateral member 306A may form a curved surface or may form a substantially flat planar surface having at least a portion of the planar surface lying in a second plane that is perpendicular to both the top surface 312A and the bottom surface 314A. Similarly, inward facing surface 318B form a second sidewall of lateral member 306B coupling top surface 312B and bottom surface 314B. The second sidewall of lateral member 306B may form a curved surface or may form a substantially flat planar surface having at least a portion of the planar surface lying in a second plane that is perpendicular to both the top surface 312B and the bottom surface 314B.

In some examples, each of lateral members 306 are defined by length dimension $L_{LM}$, width dimension $W_{LM}$, and height dimension $H_{LM}$. In some examples, the height dimension $H_{LM}$ and width dimension $W_{LM}$ of lateral members 306 may be uniform in cross section along the respective longitudinal axis $AX_{3A}$ and $AX_{3B}$. For example, the value of the width dimension $W_{LM}$ of lateral members 306 may be substantially uniform along the entire length of lateral member 306 and/or the value of the height dimension $H_{LM}$ may be substantially uniform along the entire lengths of lateral members 306. However, in some instances, the value of the length dimension $L_{LM}$, width dimension $W_{LM}$, and/or height dimension $H_{LM}$ of lateral members 306 may not be uniform.

Side member 308A includes a distal end $\mathbf{309}_{A1}$ coupled to first end 307A of lateral member 306, and a proximal end $\mathbf{309}_{A3}$ coupled to a first end 330A of connector member 304. Side member 308B includes a distal end $\mathbf{309}_{B1}$ coupled to second end 307B of lateral member 306, and a proximal end $\mathbf{309}_{B3}$ coupled to a second end 330B of connector member 304. The coupling formed between lateral member 306 and connector member 304 by end members 308A and 308B forms the shape of ring 302 that encircles and partially encloses the space 130 included between lateral member 306 and connector member 304.

Each side member 308 includes a length dimension $L_{SM}$, width dimension $W_{SM}$, and height dimension $H_{SM}$. The dimensions of side members 308A, 308B may or may not be uniform. As illustrated in FIG. 3B, the value of the width dimension $W_{SM}$ of side member 308A at distal end $\mathbf{309}_{A1}$ is approximately the same as the value of the width dimension $W_{SM}$ of side member 308A at the proximal end $\mathbf{309}_{A3}$. Similarly, as illustrated in FIG. 1C, the value of the width dimension $W_{SM}$ of side member 308BA at distal end $\mathbf{309}_{B1}$ is approximately the same as the value of the width dimension $W_{SM}$ of side member 308B at the proximal end $\mathbf{309}_{B3}$. In the example of FIG. 3C, the value of the width dimension $W_{SM}$ of side members 308 may be substantially the same along the entire length of side members 308A and/or the value of the height dimension $H_{SM}$ may be substantially the same along the entire length of side members 308. However, the values of the height dimension $H_{SM}$ and the values of the width dimensions $W_{SM}$ of side members 308 may be different along the length of side members 308.

Side member 308A may include top surface 322A, bottom surface 324A, outward facing surface 326A, and inward facing surface 328A. At least a portion of outward facing surface 326A forms a first sidewall of side member 308A that couples top surface 322A and bottom surface 324A, and at least a portion of inward facing surface 328A forms a second side wall of side member 308A that couples top surface 322A and bottom surface 324A. Similarly, side member 308B may include top surface 322B, bottom surface 324B, and outward facing surface 336B, and inward facing surface 328B. At least a portion of outward facing 326B forms a first sidewall of side member 308B that couples top surface 322B and bottom surface 324B, and at least a portion of inward facing surface 328B forms a second side wall of side member 308B that couples top surface 322B and bottom surface 324B.

In various examples, a top surface 322A of side member 308A may form a curved surface extending away from a longitudinal axis $AX_{4A}$ of side member 308A as top surface 322A extends from the distal end $\mathbf{309}_{A1}$ to the proximal end $\mathbf{309}_{A2}$ of the side member 308A. For example, top surface 322A may be substantially straight between lateral member 306A and lateral member 306B, and may extend away from longitudinal axis $AX_{4A}$ between lateral member 306B and first connector member 304. A bottom surface 324A of side member 308A may form a curved surface extending away from a longitudinal axis $AX_{4A}$ of side member 308A as the bottom surface 324B extends away from distal end $\mathbf{309}_{A1}$ toward the proximal end $\mathbf{309}_{A2}$ of side member 308A. For example, bottom surface 324A may be substantially straight between lateral member 306A and lateral member 306B, and may extend away from longitudinal axis $AX_{4A}$ between lateral member 306B and first connector member 304.

Top surface 322B and bottom surface 324B of side member 308B may mirror the respective top and bottom surfaces of side member 308A. For example, top surface 322B may be substantially straight between lateral member 306A and lateral member 306B, and may extend away from longitudinal axis $AX_{4B}$ between lateral member 306B and first connector member 304. Likewise, bottom surface 324B may be substantially straight between lateral member 306A and lateral member 306B, and may extend away from longitudinal axis $AX_{4B}$ between lateral member 306B and first connector member 304.

First connector member 304 includes an elongated (e.g. tubular) structure extending along a longitudinal axis $AX_1$ between a first end 330A of the first connector member 304 and a second end 330B of first connector member 304. First end 330A of first connector 304 couples to the proximal end $\mathbf{309}_{A2}$ of side member 308A and second end 330B of first connector 304 couples to proximal end $\mathbf{309}_{B2}$ of side member 308B. First connector 304 includes a center portion 330C that is located between first end 330A.

First connector member 304 may include a first side surface 331A, a second side surface 331B, an outer surface 332, and an inner surface 334. At least a portion of side surface 331A may define a plane that is substantially parallel to a plane defined by at least a portion of side surface 331B. The planes defined by side surfaces 331A and 331B (collectively, side surfaces 331) may each be substantially perpendicular to a plane defined by either (or both) of top surfaces 312 of lateral members 306 and/or a plane defined by either (or both) of bottom surfaces 314 of lateral members 306.

Side surface 331A includes an aperture 340A and side surface 331B includes aperture 340B. First connector member 304 includes a hollow region 338 defined by inner surface 336 and apertures 340A, 340B (collectively, apertures 340). Hollow region 338 may define an axis of rotation $AX_1$ that is parallel to an axis $AX_{2A}$ defined by lateral member 306A or axis $AX_{2B}$ defined by lateral member 306B. Hollow region 338 extends from aperture 340A through first connector member 304 to aperture 340B. Hollow region 338 may be configured to receive a connector (e.g., an elongated connector), such as a pin, screw, or other type of connector. For example, connector 300 may be configured to receive a fall arresting device such as a self-retracting lifeline (SRL) by receiving a pin of an SRL through hollow region 338 (e.g., as illustrated in FIG. 6).

In some examples, apertures 340 are generally circular and are defined by a radius $R_A$. In other examples, apertures 340 may be defined by other shapes, such as an oval, square, etc. and may be defined by a height dimension $H_A$ and width dimension $W_A$. In some examples, hollow region 338 is generally cylindrical. However, hollow region 338 may be any 3-dimensional shape, such as a rectangular prism.

First connector member 304 may be defined by length dimension $L_{CM}$. In some examples, as illustrated in FIG. 3A, the value of the length dimension $L_{CM}$ of first connector member 304 is less than the value of the length dimension $L_{LM}$ of lateral members 306. First connector member 304 may be defined by a height dimension $H_{CM}$ and width dimension $W_{CM}$. As illustrated in FIG. 3, in some examples, the value of the height dimension $H_{CM}$ of first connector member 304 is greater than the value of the height dimension $H_{LM}$ of lateral members 306. First connector member 304 may be defined by a radius $R_{CM}$.

In some examples, connector 300 includes second connector member 370. Second connector member 370 may be integrally formed with first connector member 304, lateral members 306, and side members 308. In other words, in some examples, second connector member 370, first connector member 304, lateral members 306, and side members 308 form a single (e.g., inseparable) structure.

Second connector member 370 includes at least one arm configured to receive a fall arresting device. As illustrated in FIGS. 3A-3C, second connector member 370 include arms 372A, 372B (collectively, arms 372) coupled to, and extending away from, first connector 304. However, in some examples, second connector member 370 may include more or fewer arms 372.

In some examples, arms 372 are generally C-shaped. For example, arm 372A may include a top curved portion 374A coupled to a midportion 375A, and bottom curved portion 376A coupled to midportion 375A opposite top portion 374A. Likewise, arm 372B may include a top curved portion 374B coupled to a midportion 375B, and bottom curved portion 376B coupled to midportion 375B opposite top portion 374B. Top portion 374A of arm 372A connects to first connector member 304 above a location where bottom portion 376A of arm 372A connects to first connector member 304. Similarly, top portion 374B of arm 372B connects to first connector member 304 above a location where bottom portion 376B of arm 372B connects to first connector member 304.

Arm 372A extends away from first connector member 304 along a longitudinal axis $AX_{5A}$ that is perpendicular to axis $AX_1$. Likewise, arm 372B extends away from first connector member 304 along a longitudinal axis $AX_{5B}$ that is perpendicular to axis $AX_1$ and parallel to axis $AX_{5A}$. In some examples, arms 372B couple to first connector member 304 on a side of first connector member 304 that is opposite space 310, lateral members 306, and side members 308.

Arm 372A includes front surface 378A, back surface 380A, outer surface 382A, and inner surface 384A. Outer surface 382A may extend along the outside of top curved portion 374A, midportion 374C, and bottom curved portion 374B of arm 372A. Similarly, inner surface 384A extends along the inside of top curved portion 374A, midportion 375A, and bottom curved portion 376A of arm 372A. At least a portion of outer surface 382A forms an outer wall that couples front surface 378A and back surface 380A, and at least a portion of inner surface 384A forms an inner wall that couples front surface 378A and back surface 380A.

Likewise, arm 372B includes front surface 378B, back surface 380B, outer surface 382B, and inner surface 384B. Outer surface 382B may extend along the outside of top curved portion 374B, midportion 375B, and bottom curved portion 376B of arm 372B. Similarly, inner surface 384B extends along the inside of top curved portion 374B, midportion 375B, and bottom curved portion 376B of arm 372B. At least a portion of outer surface 382B forms an outer wall that couples front surface 378B and back surface 380B, and at least a portion of inner surface 384B forms an inner wall that couples front surface 378B and back surface 380B.

Arms 372 are spaced apart from one another along the length of first connector member 304. For example, back surface 380A of arm 372A may face front surface 378B of arm 372B, and the distance between back surface 380A and front surface 378B may be a distance D. In some examples, distance D is large enough to allow a swivel eye of an SRL to fit between arms 372, and small enough to allow a single carabiner or other connector to couple to both of arms 372.

Arms 372A, 372B each include a respective opening 385A, 385B (collectively, openings 385) that exposes the respective inner surfaces 384A, 384B of arms 372A, 372B. Openings 385 are configured to receive a connecting device (e.g., a carabiner). For example, openings 385 may be defined by a particular shape having a width dimension $W_{OPEN}$ and a height dimension $H_{OPEN}$. In some examples, as illustrated in FIG. 3A, openings 385 are generally oblong (e.g., a generally oval shape). However, openings 385 may be any shape. In some examples, connector 300 may receive and be coupled to a fall arresting device via openings 385. For instance, a device (e.g., a carabiner) may be inserted through openings 385 and around the exterior of arms 372 to couple connector 300 with a fall arresting device.

In this way, connector 300 may receive and be coupled to a fall arresting device (e.g., an SRL) via first connector member 304 and/or second connector member 370.

Figure 4:
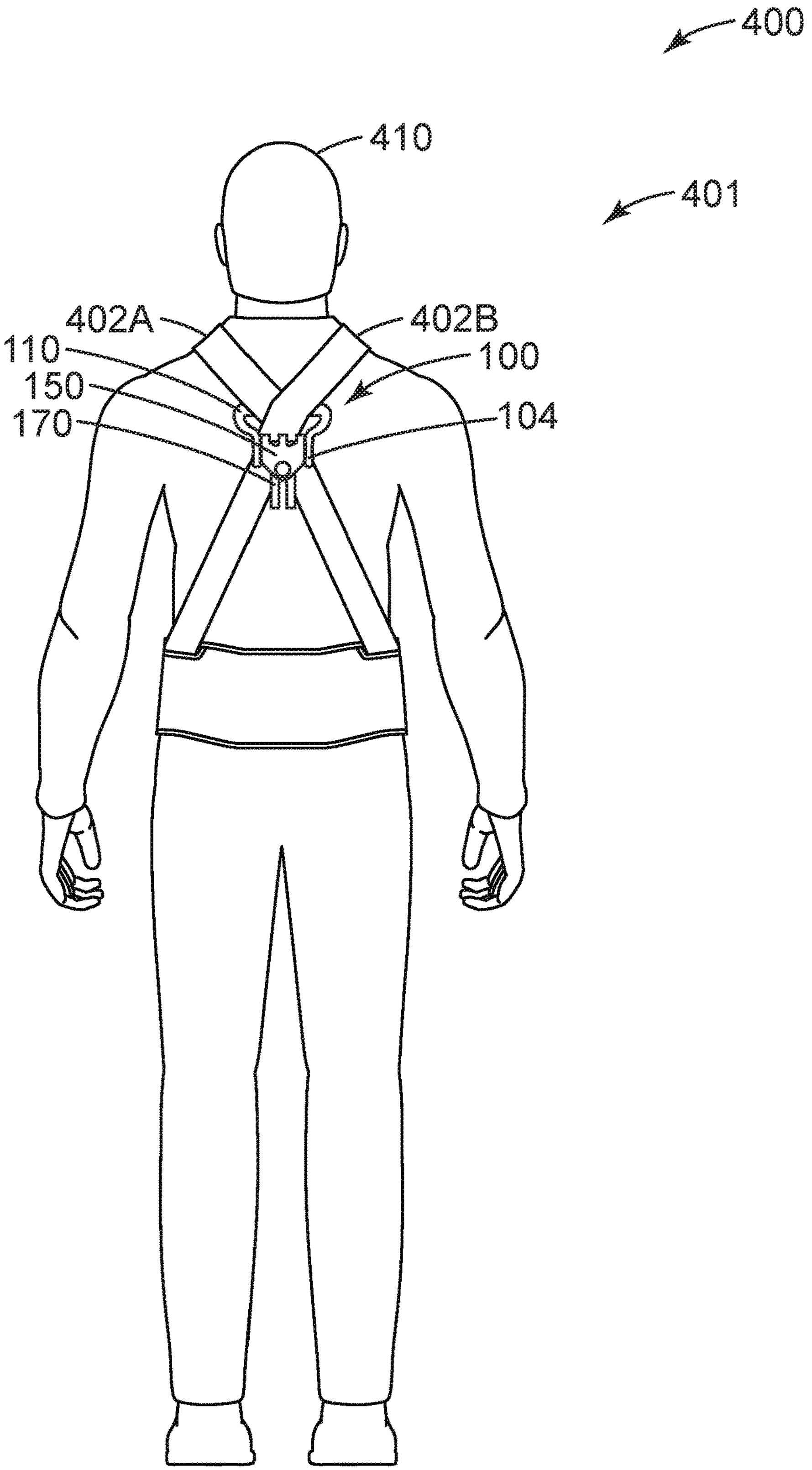
FIG. 4 is a front view of an example fall protection system that includes an example connector of FIGS. 1A-1E linking a fall arresting device to a safety harness.

FIG. 4 is a front view of an example fall protection system 400 that includes an example connector linking a fall arresting device to a safety harness. As illustrated in FIG. 4, system 400 includes the connector 100 of FIGS. 1A-1F. However, system 400 may include any of connectors 100, 200, or 300 illustrated in FIG. 1A-1F, 2A-2D, or 3A-3C, respectively.

System 400 includes harness 401 coupled to connector 100. Harness 401 may be worn by an operator 410 (e.g., a worker). Harness 401 may include one or more straps, such as straps 402A and 402B (collectively, straps 402), that are secured to operator 410. Harness 401 is one example of a safety harness that may be used in conjunction with connector 100 as part of a fall arrest system, and many other types of harness may exist that may be used with connector 100 in a fall arrest system.

As illustrated in FIG. 4, connector 100 includes a ring 102 formed by first connector member 104, lateral member 106, and side members 108A, 108B. Ring 102 encircles a space 110 that is configured to receive straps 402 included as part of harness 401. In some examples, straps 402 are positioned under first connector member 104, swivel member 150, and second connector member 170, and over lateral member 106. In other words, one or more of straps 402 may be routed through space 110 of connector 100. Straps 402A and 402B may cross one another, which may help secure connector 100 to harness 401 and hence operator 410.

Figure 5:
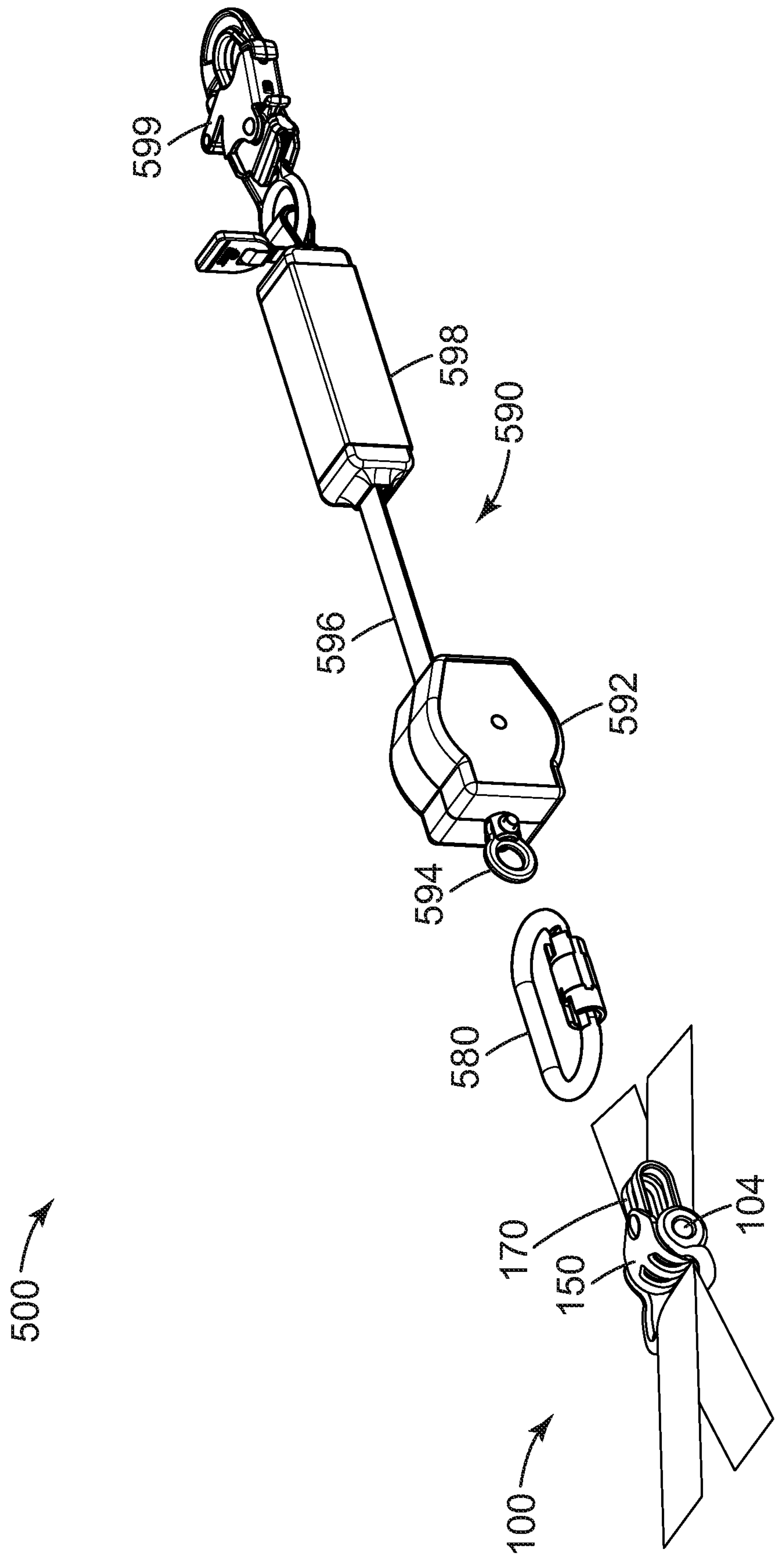
FIG. 5 is a perspective view of an example fall protection system that includes the example connector of FIGS. 1A-1E for coupling to a fall arresting device.

FIG. 5 is a perspective view of an example fall protection system 500 that includes an example connector and a fall arresting device. As illustrated in FIG. 5, system 500 includes the connector 100 of FIGS. 1A-1F. However, system 500 may include any of connectors 100, 200, or 300 illustrated in FIG. 1A-1F, 2A-2D, or 3A-3C, respectively. System 500 also includes a fastener 580 (e.g., a carabiner) and a fall arresting device 590. Fall arresting device 590 includes SRL 592, connecting ring 594, lifeline 596, energy absorbing system 598, and a support structure connector 599.

In the example of FIG. 5, connector 100 may be configured to receive a fall arresting device via second connector member 170. For instance, fastener 580 may be inserted through a space encircled by second connector member 170. Connecting ring 594 may be configured to receive a portion of the fastener 580 while another portion of the connector device 589 is configured to be received within the space encircled by the second connection member 170 to pivotally couple the fall arresting device 590 to connector 100 and hence, a safety harness.

FIG. 6 is a perspective view of an example fall protection system that includes the example connector of FIGS. 1A-1F for coupling to a fall arresting device. As illustrated in FIG. 6, system 600 includes the connector 100. However, system 600 may include any of connectors 100, 200, or 300 illustrated in FIG. 1A-1F, 2A-2D, or 3A-3C, respectively. System 600 also includes a fall arresting device 690.

In some examples, fall arresting device 690 includes a mounting rod 682 and an SRL connector 680 configured to couple a dual SRL system 694 to connector 100. Dual SRL system 694 includes a pair of SRLs 694A, 694B, lifelines 696A, 696B, and support structure connectors 698A, 698B. First connector member 104 of connector 100 is configured to receive mounting rod 682 to couple connector 100 to fall arresting device 690.

As used herein, the designation of a first, a second, or a third element and the like is used to merely distinguish one element from another. The terms are not used in the quantitative sense, used to imply or limit the total number of elements present, or used imply a particular order of the numbered elements in the described device. Similarly, references to top, bottom, side, and the like are used to show relative positions of various elements and are not intended to limit the orientation of the elements.

The details of one or more examples of the disclosure are set forth in the accompanying drawings and the description below. Other features, objects, and advantages of the disclosure will be apparent from the description and drawings, and from the claims.

What is claimed is:

1. A safety harness comprising a connector for coupling at least two fall arresting devices to a safety harness, the safety harness comprising at least one strap and the connector comprising:
- a ring that encircles a space that receives the at least one strap of the safety harness, the ring comprising:
  - a lateral member;
  - a first side member coupled to a first end of the lateral member; and
  - a second side member coupled to a second end of the lateral member that is opposite the first end;
- a first connector member configured to receive a first fall arresting device, wherein the first connector member is integrally formed with the lateral member, first side member, and second side member, with the proviso that the connector has no component that is integral with the first connector member, other than the lateral member, the first side member, and the second side member, wherein the first connector member comprises:
  - a first side surface including a first aperture, the first side surface defining a plane that is substantially perpendicular to a plane defined by a top surface of the lateral member;
  - a second side surface including a second aperture;
  - an outer surface;
  - a hollow region extending from the first aperture to the second aperture and exposing an inner surface of the first connector member, wherein the hollow region receives a fastener that couples the first fall arresting device to the connector; and
  - wherein the space that receives the at least one strap of the safety harness, and the hollow region that receives the fastener that couples the first fall arresting device to the connector, are the only spaces defined by the integrally-formed first connector member, lateral member, first side member and second side member, that are configured to receive an item therein;

and
- a second connector member configured to receive a second fall arresting device, the second connector member being pivotably coupled to the first connector member;
- wherein the harness further comprises the first fall arresting device and the second fall arresting device, both the first fall arresting device and the second fall arresting device being connected to the safety harness via the connector.

2. The safety harness of claim 1, wherein the hollow region defines a first axis that is substantially parallel to a second axis defined by the lateral member.

3. The safety harness of claim 1, wherein a first junction between the lateral member and the first side member is curved and a second junction between the lateral member and the second side member is curved.

4. The safety harness of claim 1, wherein the second connector member is configured to pivot about an axis that is substantially perpendicular to an axis defined by a hollow region within the first connector member.

5. The safety harness of claim 1, the first connector member comprising one or more grooves along a length of the first connector member, and wherein a first radius of the first connector member at a location of the one or more grooves is less than a second radius of the first connector member at an end of the first connector member.

6. The safety harness of claim 1, wherein the first connector member includes a first flange at a first end of the first connector member and a second flange at a second end of the first connector member that is opposite the first end.

7. The safety harness of claim 1, wherein the first side member is substantially parallel to the second side member.

8. The safety harness of claim 1, wherein the second connector member comprises:
- a first arm extending from the first connector member; and
- a second arm extending from the first connector member,
- wherein a first side of the first arm is substantially parallel to a first side of the second arm,
- wherein the first side of the first arm and the first side of the second arm are each substantially parallel to the first side member and the second side member.

9. The safety harness of claim 1, wherein the first fall arresting device is coupled to the first connector member via a hollow region in the first connector member.

10. The safety harness of claim 1, wherein the second fall arresting device is coupled to the second connector member via an opening of the second connector member.

11. The safety harness of claim 1, wherein the first fall arresting device is a first self-retracting lifeline (SRL) and the second fall arresting device is a second self-retracting lifeline (SRL).

* * * * *